United States Patent
Arai et al.

(10) Patent No.: US 11,237,322 B2
(45) Date of Patent: Feb. 1, 2022

(54) OPTICAL FIBER MANUFACTURING METHOD USING RELATIVE BULK DENSITIES

(71) Applicants: FURUKAWA ELECTRIC CO., LTD., Tokyo (JP); NIPPON TELEGRAPH AND TELEPHONE CORPORATION, Tokyo (JP)

(72) Inventors: Shinichi Arai, Tokyo (JP); Harumi Inaba, Tokyo (JP); Shigeto Matsumoto, Tokyo (JP); Takeshi Yagi, Tokyo (JP); Shinichi Aozasa, Tokyo (JP); Kyozo Tsujikawa, Tokyo (JP); Kazuhide Nakajima, Tokyo (JP)

(73) Assignees: FURUKAWA ELECTRIC CO., LTD., Tokyo (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 305 days.

(21) Appl. No.: 16/571,974

(22) Filed: Sep. 16, 2019

(65) Prior Publication Data

US 2020/0012042 A1    Jan. 9, 2020

Related U.S. Application Data

(63) Continuation of application No. PCT/JP2018/009008, filed on Mar. 8, 2018.

(30) Foreign Application Priority Data

Mar. 24, 2017    (JP) .............................. JP2017-058653

(51) Int. Cl.
    *G02B 6/02*    (2006.01)
    *G02B 6/036*   (2006.01)

(52) U.S. Cl.
    CPC ..... *G02B 6/02395* (2013.01); *G02B 6/02009* (2013.01); *G02B 6/02242* (2013.01); *G02B 6/02271* (2013.01); *G02B 6/03644* (2013.01)

(58) Field of Classification Search
    CPC ............ G02B 6/02395; G02B 6/02009; G02B 6/03644; G02B 6/02271; G02B 6/02242;
    (Continued)

(56) References Cited

U.S. PATENT DOCUMENTS

| 5,352,259 A | 10/1994 | Oku et al. |
| 8,181,487 B2 * | 5/2012 | Sugizaki ........... C03B 37/01231 65/393 |

(Continued)

FOREIGN PATENT DOCUMENTS

| CN | 1078309 A | 11/1993 |
| CN | 102596832 A | 7/2012 |

(Continued)

OTHER PUBLICATIONS

Combined Chinese Office Action and Search Report dated May 6, 2021 in corresponding Chinese Patent Application No. 201880015566.8 (with English Translation and English Translation of Category of Cited Documents) 11 pages.

(Continued)

*Primary Examiner* — Andrew Jordan
(74) *Attorney, Agent, or Firm* — Oblon, McClelland, Maier & Neustadt, L.L.P.

(57) ABSTRACT

An optical fiber manufacturing method includes setting a first holding member and a rod inside a glass pipe, the first holding member made of glass and having plural holes formed, so that the rod is supported by the first holding member; filling glass particles between the rod and a glass pipe inner wall; holding the rod such that the rod and the filled glass particles are enclosed by the glass pipe inner wall (Continued)

and the first and second holding members, and sealing one end of the glass pipe and manufacturing an intermediate; and manufacturing an optical fiber from the intermediate, wherein a bulk density of the first and second holding members is set with reference to a bulk density of a filling portion made from the glass particles, and the predetermined range is determined according to a core diameter permissible variation range in its longitudinal direction.

11 Claims, 25 Drawing Sheets

(58) Field of Classification Search
CPC .............. G02B 6/0365; G02B 6/02295; C03B 2205/08; C03B 2205/44; C03B 2205/72; C03B 37/02781; C03B 37/01248; C03B 37/01211; C03B 37/027; C03B 37/01297; C03B 2203/23; C03B 2203/14; C03B 2203/32; C03B 2203/34
See application file for complete search history.

(56) References Cited

U.S. PATENT DOCUMENTS

| 9,075,185 | B2* | 7/2015 | Kumano | ............... G02B 6/032 |
| 2007/0214841 | A1 | 9/2007 | Pedrido | |
| 2010/0326139 | A1* | 12/2010 | Sugizaki | ........... C03B 37/01234 |
| | | | | 65/412 |
| 2011/0100063 | A1 | 5/2011 | Desorcie et al. | |
| 2011/0132038 | A1 | 6/2011 | Dawes et al. | |
| 2013/0136409 | A1* | 5/2013 | Kumano | ............... G02B 6/032 |
| | | | | 385/125 |
| 2020/0012042 | A1* | 1/2020 | Arai | ................. C03B 37/01211 |

FOREIGN PATENT DOCUMENTS

| CN | 103936277 A | 7/2014 |
| JP | 58-104031 A | 6/1983 |
| JP | 3-247529 A | 11/1991 |
| JP | 8-59261 A | 3/1996 |
| JP | 9-124332 A | 5/1997 |
| JP | 2007-534591 A | 11/2007 |
| JP | 2007-534592 A | 11/2007 |
| JP | 2013-512851 A | 4/2013 |
| JP | 5995298 B1 | 9/2016 |
| JP | 2017-19675 A | 1/2017 |
| JP | 2017-31009 A | 2/2017 |

OTHER PUBLICATIONS

Extended European Search Report dated Nov. 19, 2020 in European Patent Application No. 18771583.4, 7 pages.
International Search Report dated Jun. 12, 2018 in PCT/JP2018/009008 filed Mar. 8, 2018 (with English Translation).
Written Opinion dated Jun. 12, 2018 in PCT/JP2018/009008 filed Mar. 8, 2018.

* cited by examiner (STATE S7)

(STATE S17)

(STATE S27)

OPTICAL FIBER MANUFACTURING METHOD USING RELATIVE BULK DENSITIES

CROSS-REFERENCE TO RELATED APPLICATION(S)

This application is a continuation of International Application No. PCT/JP2018/009008, filed on Mar. 8, 2018 which claims the benefit of priority of the prior Japanese Patent Application No. 2017-058653, filed on Mar. 24, 2017, the entire contents of which are incorporated herein by reference.

BACKGROUND

The present disclosure relates to an optical fiber manufacturing method.

Typically, as optical fiber manufacturing methods, for example, methods have been disclosed in which an intermediate object that is obtained by inserting a glass rod and glass particles inside a glass tube is heat-melted and an optical fiber is wiredrawn (see Japanese National Publication of International Patent Application No. 2007-534591 and Japanese National Publication of International Patent Application No. 2007-534592). Moreover, in the latter Patent Application, it is disclosed that a plurality of glass rods is inserted inside the glass tube, and each glass rod is held by inserting the upper end portion and the lower end portion thereof in one of a plurality of openings formed in a glass matrix that is a circular glass plate.

SUMMARY

However, in the conventional technology mentioned above, regarding an optical fiber manufactured as a result of wiredrawing from an intermediate object, it is difficult to achieve a stable core diameter in the longitudinal direction of the optical fiber. Herein, "achieving a stable core diameter in the longitudinal diameter of the optical fiber" implies that "the fluctuation in the core diameter over the entire area in the longitudinal direction of the optical fiber is within the fluctuation range that is permissible in the optical fiber (hereinafter, called the permissible fluctuation range)".

Particularly, when an optical fiber is wiredrawn from an intermediate object in which the upper end portions and the lower end portions of the glass rods are held in a glass matrix, the core diameter of the optical fiber undergoes excessive fluctuation outside of the permissible fluctuation range in between the starting portion and the ending portion of the wiredrawing and the intermediate portion (for example, the middle portion in the longitudinal direction of the optical fiber). Such excessive fluctuation of the core diameter leads to a decline in the yield ratio at the time of manufacturing optical fibers. For example, as disclosed in Japanese National Publication of International Patent Application No. 2007-534592, even if a glass matrix is made of glass particles that is the same as the filling target, between the portion filled with glass particles in the glass tube and the glass matrix, sometimes there occurs a non-negligible difference in the thermal contraction at the time of heat-melting. Hence, it becomes difficult to eliminate the excessive fluctuation in the core diameter.

According to an aspect of the present disclosure, there is provided an optical fiber manufacturing method for manufacturing an optical fiber that includes a core portion made of glass and a cladding portion made of glass and formed on outer periphery of the core portion. The optical fiber manufacturing method includes setting such that a first holding member and a core rod are placed inside a glass pipe constituting the cladding portion, the first holding member being one of a pair of holding members that are made of glass and have a plurality of holes formed thereon, the core rod including a core forming portion serving as the core portion and including a cladding forming portion serving as a portion adjacent to the core portion across outer periphery of the core portion, in such a way that the core rod is supported by the first holding member; filling glass particles in a gap between the core rod and an inner wall of the glass pipe; holding the core rod such that a second holding member of the pair of holding members is placed inside the glass pipe, in such a way that the core rod is held in a sandwiched manner in between the first holding member and the second holding member, and the core rod and the filled glass particles are housed in an area enclosed by the inner wall of the glass pipe, the first holding member, and the second holding member, and sealing one end portion of the glass pipe and manufacturing an intermediate object; and manufacturing an optical fiber using the intermediate object, wherein a bulk density of the first holding member and the second holding member is set to be within a predetermined range with reference to bulk density of a filling portion filled with the glass particles, and the predetermined range is determined according to a permissible variation range for a core diameter in a longitudinal direction of the optical fiber.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
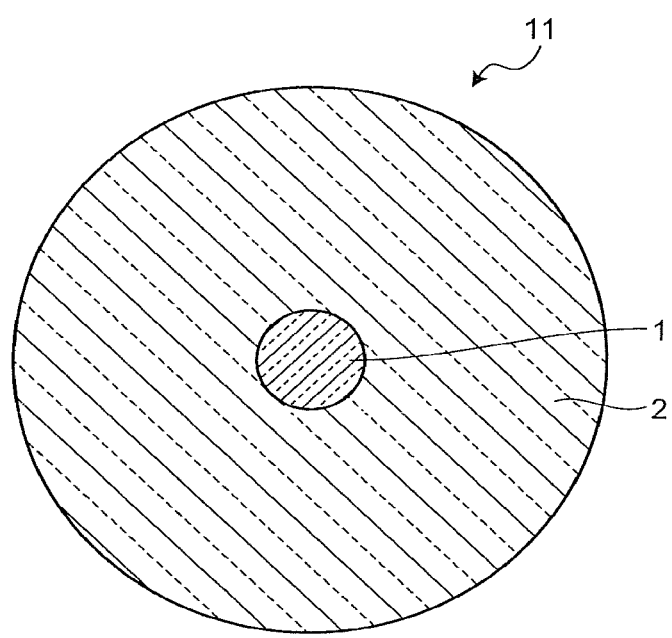
FIG. 1 is a schematic cross-sectional view illustrating an exemplary configuration of an optical fiber manufactured by an optical fiber manufacturing method according to a first embodiment of the present disclosure.

Exemplary embodiments of the present disclosure are described below in detail. However, the present disclosure is not limited by the embodiments described below. Moreover, in the drawings, identical or corresponding elements are referred to by the same reference numerals. Regarding the terms that are not particularly defined in the present written description, the definitions and the measurement methods are followed as given in ITU-T (International telecommunication Union) G.650.1 and G.650.2.

First Embodiment

FIG. 1 is a schematic cross-sectional view illustrating an exemplary configuration of an optical fiber manufactured by an optical fiber manufacturing method according to a first embodiment of the present disclosure. An optical fiber 11 according to the first embodiment is made of silica based glass and, as illustrated in FIG. 1, includes a core portion 1 and a cladding portion 2 that is formed on the outer periphery of the core portion 1. Moreover, although not illustrated in FIG. 1, there is a coating formed on the outer periphery of the cladding portion 2. The coating that is usually used in optical fibers is used.

The core portion 1 is made of silica glass added with $GeO_2$ that serves as a dopant for enhancing the refractive index. The cladding portion 2 is made of pure silica glass not added with any dopant for refractive index adjustment.

Figure 2:
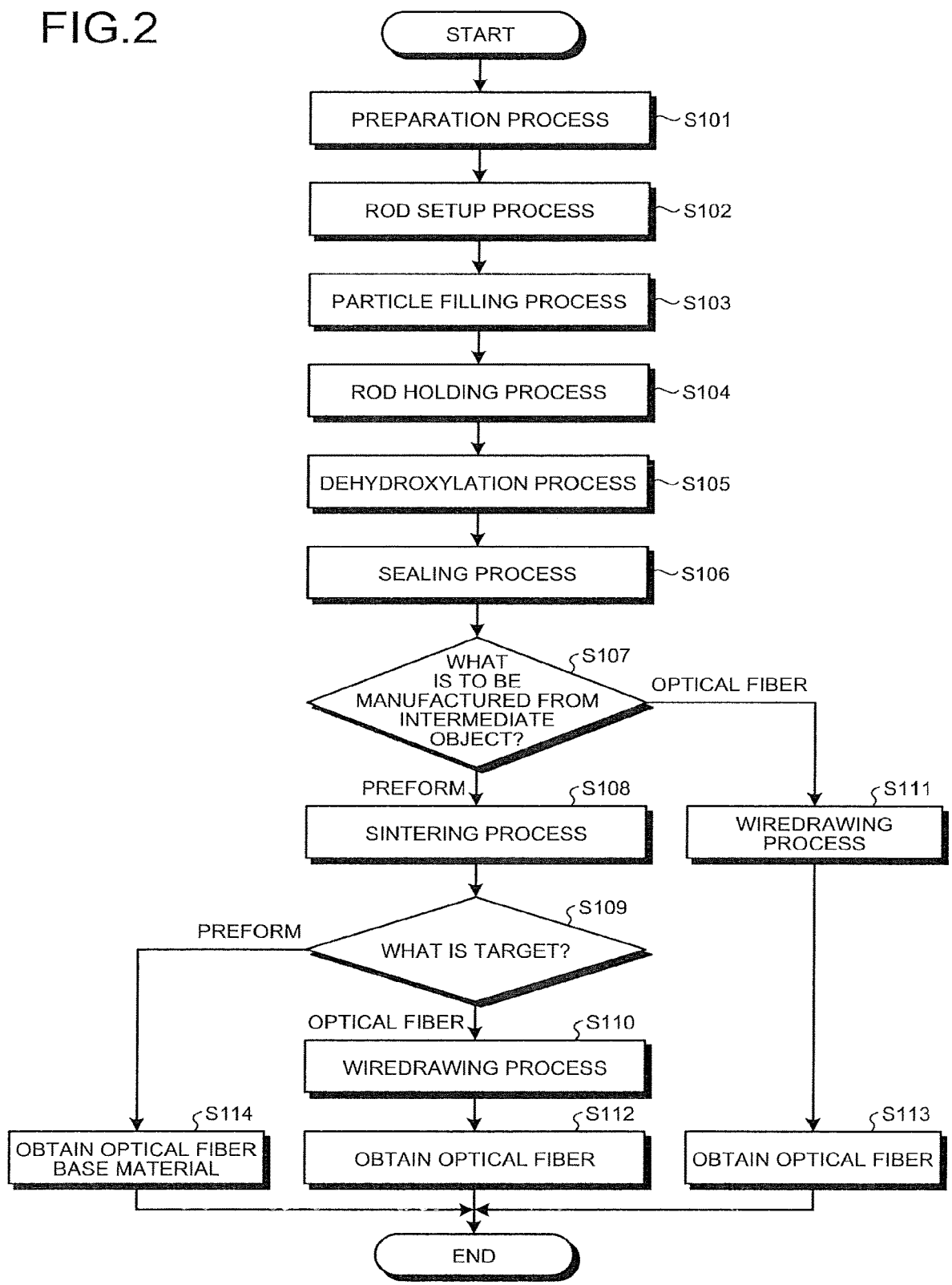
FIG. 2 is a flowchart for explaining an example of the optical fiber manufacturing method according to the first embodiment of the present disclosure.

Given below is the explanation of the optical fiber manufacturing method according to the first embodiment of the present disclosure. FIG. 2 is a flowchart for explaining an example of the optical fiber manufacturing method according to the first embodiment of the present disclosure. As illustrated in FIG. 2, in the optical fiber manufacturing method according to the first embodiment, firstly, a preparation process (Step S101) is performed for preparing the necessary constituent elements.

Figure 3:
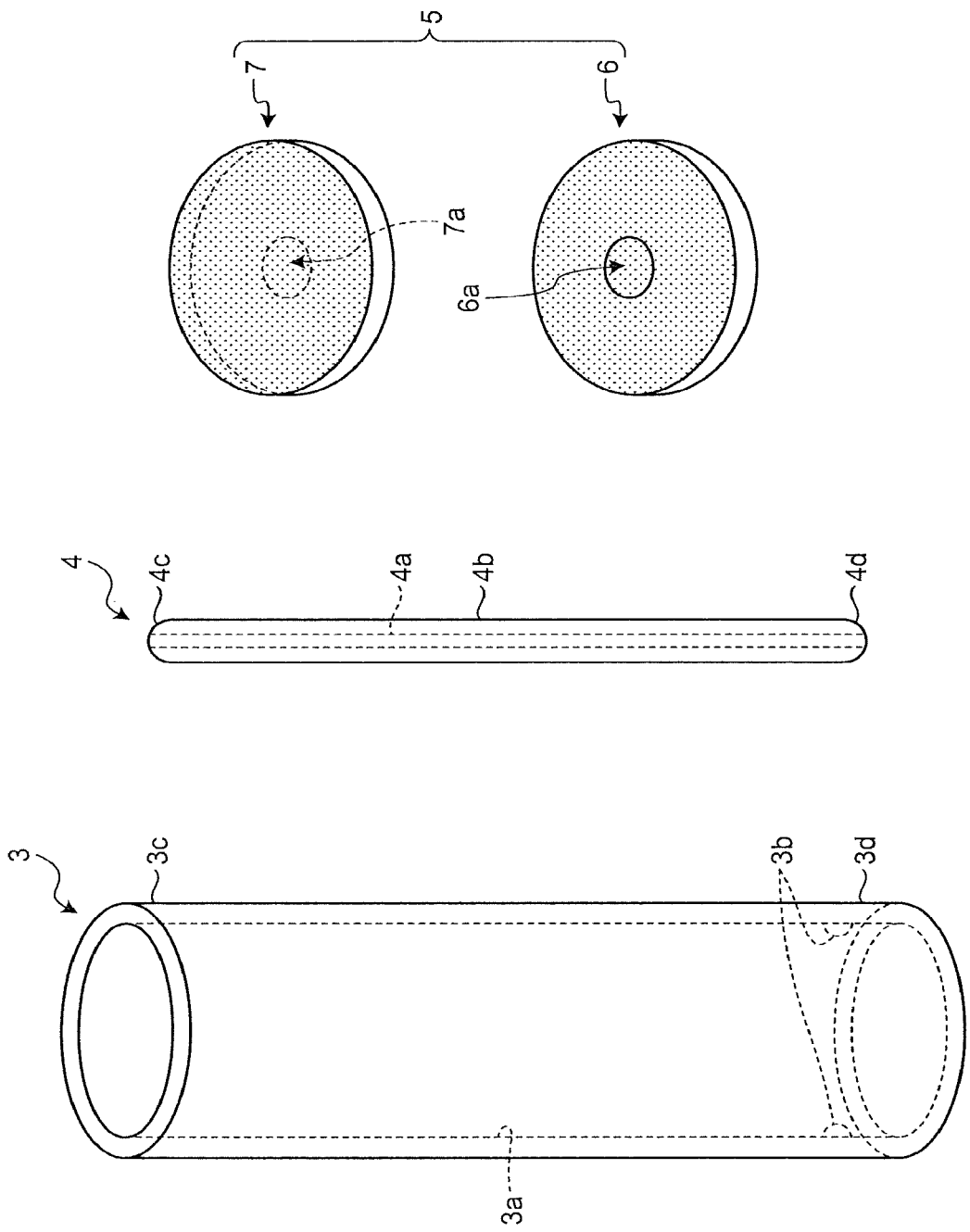
FIG. 3 is a schematic diagram for explaining a preparation process performed according to the first embodiment.

FIG. 3 is a schematic diagram for explaining the preparation process performed according to the first embodiment. In the preparation process performed at Step S101, a glass pipe 3, a core rod 4, and a pair of holding members 5 are prepared as illustrated in FIG. 3.

As illustrated in FIG. 3, the glass pipe 3 is a glass member having a continuously hollow pipe interior 3a in the longitudinal direction. In the glass pipe 3, an upper end portion 3c and a lower end portion 3d have an opening to enable connection between the outside of the glass pipe 3 and the pipe interior 3a. In the first embodiment, the glass pipe 3 is manufactured of a synthetic silica pipe that is a cylindrical pipe having, for example, the outer diameter of 150 mm and having the inner diameter of 130 mm and that does not have any dopant added thereto for refractive index adjustment. Moreover, as illustrated in FIG. 3, in the pipe interior 3a, on the side of the lower end portion 3d of the glass pipe 3, protruding portions 3b are formed which protrudes from the inner wall face of the glass pipe 3. The protruding portions 3b receives the pair of holding members 5, which are inserted in the pipe interior 3a from the side of the upper end portion 3c of the glass pipe 3, such that the pair of holding members 5 does not fall out from the side of the lower end portion 3d of the glass pipe 3. In the first embodiment, for example, the protruding portions 3b are formed at two mutually opposite positions on the inner wall face of the glass pipe 3. However, the number and the positions of the protruding portions 3b formed on the inner wall face of the glass pipe 3 are not limited to this example. Alternatively, by taking into account the positions for holding the core rod 4 in the pipe interior 3a and by taking into account the ease of holding the members, it is possible to set an appropriate number of the protruding portions 3b (for example, three protruding portions 3b) and to set appropriate positions of the protruding portions 3b (for example, the positions of apexes of a quadrilateral or the positions that are continuous along the inner wall face of the glass pipe 3). The glass pipe 3 that is prepared in this manner constitutes the cladding portion 2 of the optical fiber 11 illustrated in FIG. 1.

As illustrated in FIG. 3, the core rod 4 includes a core forming portion 4a and a cladding forming portion 4b that is formed adjacent to the core forming portion 4a across the outer periphery of the core forming portion 4a. The core forming portion 4a is made of silica glass having $GeO_2$ added thereto, and functions as the core portion 1 of the optical fiber 11 illustrated in FIG. 1. The cladding forming portion 4b is made of pure silica glass and is formed adjacent to the cladding portion 2 in the optical fiber 11 across the outer periphery of the core portion 1. The refractive index difference of the core forming portion 4a with respect to the cladding forming portion 4b is, for example, in the range from equal to or greater than 0.23% to equal to or smaller than 3.5% (in the first embodiment, the refractive index difference is equal to 0.38%). Moreover, in the first embodiment, the outer diameter of the cladding forming portion 4b (i.e., the diameter of the core rod 4) is double the diameter of the core forming portion 4a The core rod 4 is manufactured according to, for example, the VAD example, the OVD method, or the MCVD method. According to the first embodiment, the glass rod that includes the cladding forming portion 4b on the outer periphery of the core forming portion 4a is manufactured according to the VAD method, and the obtained glass rod is extended to have the outer diameter of 16 mm. In this way, the core rod 4 is manufactured and prepared.

The pair of holding members 5 holds the core rod 4 in the pipe interior 3a of the glass pipe 3. The pair of holding members 5 is made of silica glass and has a plurality of holes formed thereon. In the first embodiment, as illustrated in FIG. 3, the pair of holding members 5 includes a first holding member 6 and a second holding member 7. The first holding member 6 as well as the second holding member 7 is a circular glass plate having a plurality of holes formed thereon. The holes have the opening diameter of, for example, 0.1 mm, and are through holes (venting holes) enabling ventilation through the first holding member 6 and ventilation through the second holding member 7. The first holding member 6 as well as the second holding member 7 is manufactured by processing silica glass into a disc shape having the outer diameter equal to or smaller than the inner diameter of the glass pipe 3, and then by forming a plurality of holes on the disc-shaped glass plate.

Moreover, as illustrated in FIG. 3, the first holding member 6 has an engaging hole 6a formed in the central part on the face opposite to the second holding member 7 (in the first embodiment, the circular opposite face). The engaging hole 6a is a hole with which a lower end portion 4d of the core rod 4 comes in engagement when the core rod 4 is supported by the first holding member 6. The second holding member 7 has an engaging hole 7a formed in the central part on the opposite face to the first holding member 6. When the core rod 4 is held in a sandwiched manner in between the second holding member 7 and the first holding member 6, the engaging hole 7a comes in engagement with an upper end portion 4c of the core rod 4. The engaging holes 6a and 7a are formed by performing drilling such as shallow hole drilling.

The bulk density of the first holding member 6 and the second holding member 7 is comparable with the bulk density of the filling portion in which glass particles (glass particles 8 illustrated in FIG. 4 (described later)) are filled in the pipe interior 3a of the glass pipe 3. That is, the bulk density of the first holding member 6 and the second holding member 7 is set to be within a predetermined range with reference to the bulk density of the filling portion for filling glass particles in the pipe interior 3a of the glass pipe 3. The predetermined range is decided according to the permissible variation range for the core diameter in the longitudinal direction of the optical fiber to be manufactured (in the first embodiment, the optical fiber 11). For example, regarding the permissible variable range for the core diameter, if the demand is that "the variation in the core diameter across the entire area in the longitudinal direction of the optical fiber 11 is to be retrained to be equal to or smaller than 5% of the core diameter in the central part in the longitudinal direction of the optical fiber 11", then the bulk density of the first holding member 6 and the second holding member 7 is set to be in the range from equal to or greater than 0.8 times to equal to or smaller than 1.2 times of the bulk density of the glass particles filled in the filling portion in the pipe interior 3a of the glass pipe 3. Regarding the first holding member 6 and the second holding member 7, the bulk density can be set within the predetermined range by appropriately adjusting the opening diameter of the holes and the number of holes formed thereon.

After the preparation process is complete, as illustrated in FIG. 2, a rod setup process (Step S102), a particle filling process (Step S103), and a rod holding process (Step S104) are performed in that order. FIG. 4 is a schematic diagram for explaining the rod setup process, the particle filling process, and the rod holding process performed according to the first embodiment. In FIG. 4, the glass pipe is illustrated in a cross-sectional view for the purpose of illustration. Hereinafter, in the schematic diagrams illustrated for explaining the processes, the glass pipe is illustrated in a cross-sectional view in an identical manner.

Figure 4:
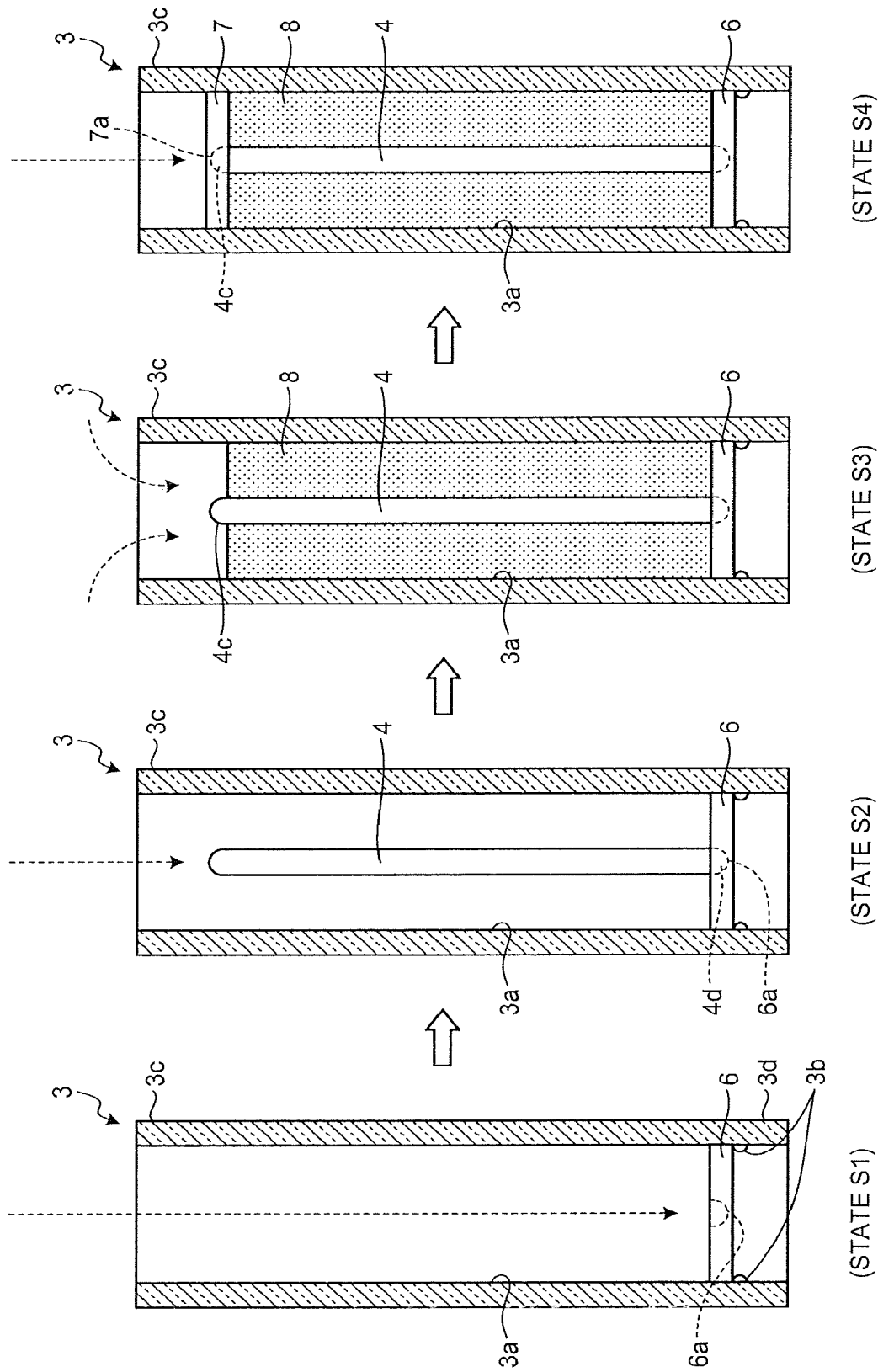
FIG. 4 is a schematic diagram for explaining a rod setup process, a particle filling process, and a rod holding process performed according to the first embodiment.

In the rod setup process performed at Step S102, as illustrated in a state S1 in FIG. 4, firstly, the first holding member 6 of the pair of holding members 5 (see FIG. 3) is placed in the pipe interior 3a of the glass pipe 3. At that time, with the engaging hole 6a facing upward (toward the upper end portion 3c of the glass pipe 3), the first holding member 6 is inserted in the pipe interior 3a from the side of the upper end portion 3c of the glass pipe 3, and is further inserted toward the lower end portion 3d along the inner wall face of the glass pipe 3. Then, the first holding member 6 reaches the positions of the protruding portions 3b and is received and supported by the protruding portions 3b. As a result, the first holding member 6 is placed in the pipe interior 3a in such a way that it does not fall out from the lower end portion 3d of the glass pipe 3.

Subsequently, as illustrated in a state S2 in FIG. 4, the core rod 4 is placed in the pipe interior 3a of the glass pipe 3 in such a way that the core rod 4 is supported by the first holding member 6. At that time, the core rod 4 is inserted in the pipe interior 3a from the side of the upper end portion 3c of the glass pipe 3. Then, the lower end portion 4d of the core rod 4 is engaged in the engaging hole 6a of the first holding member 6. As a result, the core rod 4 is placed in the pipe interior 3a while being supported by the first holding member 6.

In the particle filling process performed at Step S103, as illustrated in a state S3 in FIG. 4, the glass particles 8 are filled in the gap formed between the inner wall face of the glass pipe 3 and the core rod 4. The glass particles 8 are assumed to be made of silica glass having the average particle diameter in the range from equal to or greater than 50 μm to equal to or smaller than 500 μm (in the first embodiment, 200 μm). The glass particles 8 are inserted in plurality in the pipe interior 3a from the side of the upper end portion 3c of the glass pipe 3. As a result, in the area in the pipe interior 3a spanning from the top face of the first holding member 6 up to the portion close to the upper end portion 4c of the core rod 4, the gap between the inner wall face of the glass pipe 3 and the core rod 4 is filled with the glass particles 8. Meanwhile, the holes formed in the first holding member 6 are sufficiently small as compared to the glass particles 8. Hence, the glass particles 8 that are filled in the pipe interior 3a (hereinafter, called the filled glass particles 8) do not fall out from the first holding member 6 to the outside of the glass pipe 3. The same explanation is applicable to the second holding member 7.

In the rod holding process performed at Step S104, as illustrated in a state S4 in FIG. 4, the second holding member 7 of the pair of holding members 5 (see FIG. 3) is placed in the pipe interior 3a of the glass pipe 3, and the core rod 4 is held in a sandwiched manner in between the first holding member 6 and the second holding member 7. At that time, with the engaging hole 7a facing downward (toward the first holding member 6 of the pipe interior 3a), the second holding member 7 is inserted in the pipe interior 3a from the side of the upper end portion 3c of the glass pipe 3. Then, the second holding member 7 traps the filled glass particles 8 in the pipe interior 3a and causes engagement of the engaging hole 7a with the upper end portion 4c of the core rod 4. As a result, the core rod 4 and the filled glass particles 8 are placed in the area enclosed by the inner wall face of the glass pipe 3, the first holding member 6, and the second holding member 7. At the same time, the core rod 4 is held in a sandwiched manner in between the second holding member 7 and the first holding member 6. Hence, the relative position of the core rod 4 with respect to the glass pipe 3 is fixed due to the first holding member 6 and the second holding member 7.

The bulk density of the filling portion for the glass particles 8 is calculated by dividing the mass of the filled glass particles 8 by the volume of the remaining area obtained after subtracting the area occupied by the core rod 4 from the area enclosed by the inner wall face of the glass pipe 3, the first holding member 6, and the second holding member 7. As described above, the bulk density of the filling portion for the glass particles 8 is comparable with the bulk density of the first holding member 6 and the second holding member 7. In the first embodiment, for example, the bulk density is equal to 1.25 g/cm$^3$. Moreover, it is desirable that the glass particles 8 are made of the same type of silica glass as the first holding member 6 and the second holding member 7 (for example, pure silica glass).

Figure 5:
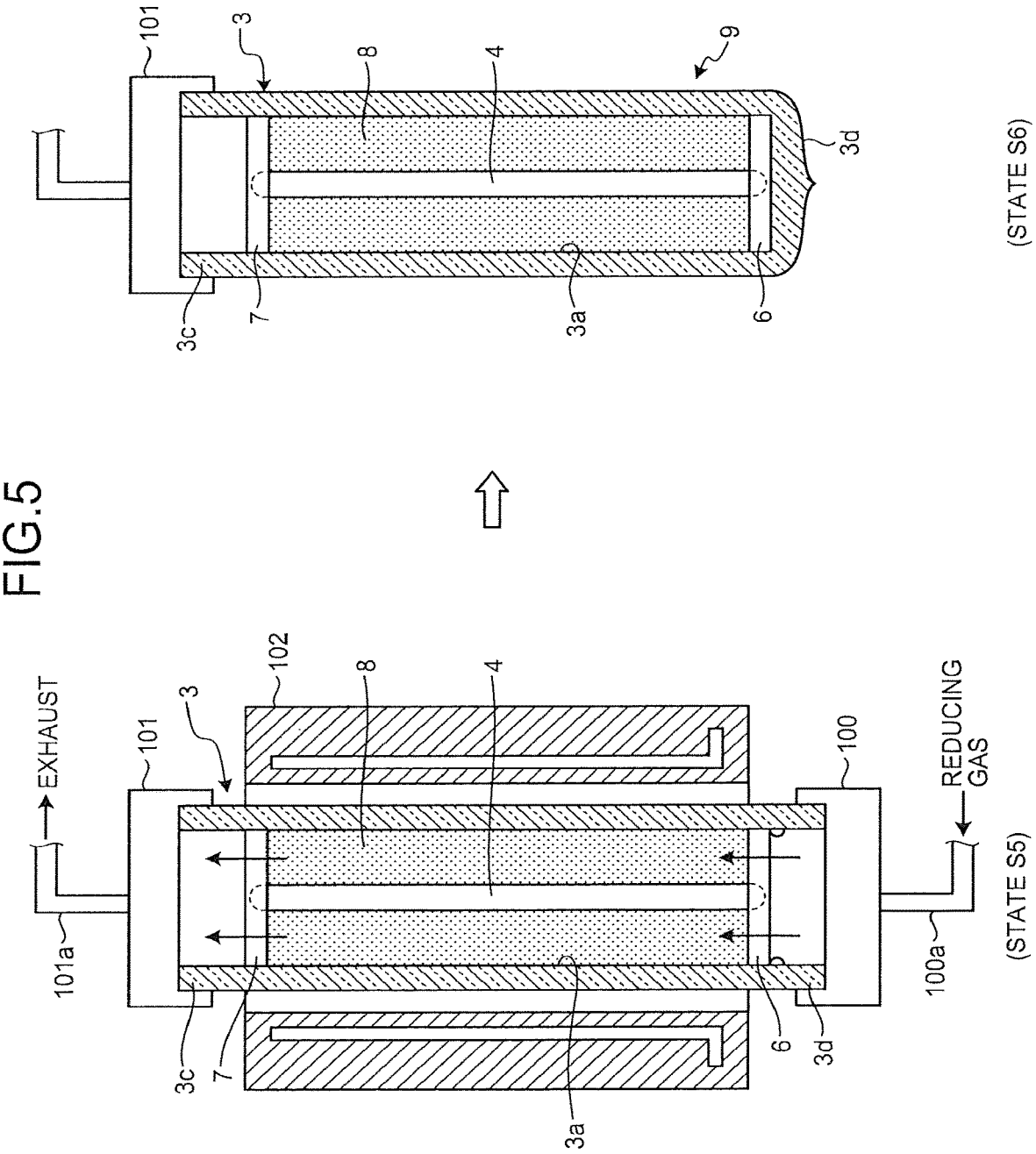
FIG. 5 is a schematic diagram for explaining a dehydroxylation process and a sealing process performed according to the first embodiment.

After the rod setup process is complete, as illustrated in FIG. 2, a dehydroxylation process (Step S105) is performed, and that is followed by a sealing process (Step S106). FIG. 5 is a schematic diagram for explaining the dehydroxylation process and the sealing process performed according to the first embodiment.

In the dehydroxylation process performed at Step S105, a reducing gas is passed into the pipe interior 3a of the glass pipe 3 through the holes formed in the first holding member 6 and the second holding member 7, and the filled glass particles 8 are subjected to dehydroxylation using the reducing gas.

More specifically, as illustrated in a state S5 in FIG. 5, firstly, lids 101 and 100 are put on the upper end portion 3c and the lower end portion 3d, respectively, of the glass pipe 3, and the pipe interior 3a including the core rod 4 and the filled glass particles 8 is made airproof. To the lid 100 put on the lower end portion 3d, a gas introduction pipe 100a is connected that leads to the airproof pipe interior 3a. To the lid 101 put on the upper end portion 3c, a gas exhaust pipe 101a is connected that leads to the airproof pipe interior 3a. Moreover, the glass pipe 3 is set in a heating furnace 102. Then, a reducing gas such as chlorine gas is supplied to the pipe interior 3a from the gas introduction pipe 100a. The reducing gas passes from the lower end portion 3d of the glass pipe 3 through the holes formed in the first holding member 6, and enters the filling portion for the glass particles 8 in the pipe interior 3a. Then, while coming in contact with each glass particle 8 in the pipe interior 3a, the reducing gas passes through the gaps among the glass particles 8 in the filling portion and flows toward the upper end portion 3c of the glass pipe 3. Then, the reducing gas flows to the upper end portion 3c of the glass pipe 3 through the holes formed in the second holding member 7, and is discharged from the gas exhaust pipe 101a.

Simultaneous to the circulation of the reducing gas, the heating furnace 102 heats, from the outer periphery of the glass pipe 3, that portion of the glass pipe 3 which at least includes the filling portion for the glass particles 8; and consequently heats the reducing gas flowing inside the filling portion for the glass particles 8 as well as heats the glass particles 8. As a result, hydroxyl is removed from the filling portion for the glass particles 8, and the filled glass particles 8 are subjected to dehydroxylation.

In the sealing process performed at Step S106 subsequent to the dehydroxylation process, as illustrated in a state S6 in FIG. 5, one end portion of the glass pipe (in the first embodiment, the lower end portion 3d) is heat-melted and subjected to diameter reduction. Hence, that end portion of the glass pipe 3 is sealed, and an intermediate object 9 is manufactured. The intermediate object 9 is a structure in which the pipe interior 3a includes the core rod 4, the first holding member 6, the second holding member 7, and the post-dehydroxylation filled glass particles 8; and has one end of the glass pipe 3 sealed. In the intermediate object 9, the lid 101 is appropriately removed from the other end of the glass pipe 3 (in the first embodiment, the upper end portion 3c), and is used in the processes performed after the sealing process.

After the sealing process is complete, an optical fiber manufacturing process is performed for manufacturing an optical fiber using the intermediate object 9 manufactured as a result of the sealing process. The optical fiber manufacturing process can be performed in the following two ways: "manufacturing an optical fiber from the intermediate object 9 via an optical fiber preform"; and "manufacturing an optical fiber from the intermediate object 9 without involving an optical fiber preform".

That is, in the optical fiber manufacturing process, in the case in which an optical fiber is to be manufactured from the intermediate object 9 via an optical fiber preform, a sintering process (Step S108) and a wiredrawing process (Step S110) illustrated in FIG. 2 are performed. In that case, since an optical fiber preform is to be manufactured from the intermediate object 9 (preform at Step S107); after the sealing process is complete, the sintering process (Step S108) is performed for manufacturing the optical fiber preform. Subsequently, since the target is to manufacture an optical fiber (optical fiber at Step S109), the wiredrawing process (Step S110) is performed for wiredrawing an optical fiber from the optical fiber preform.

Figure 6:
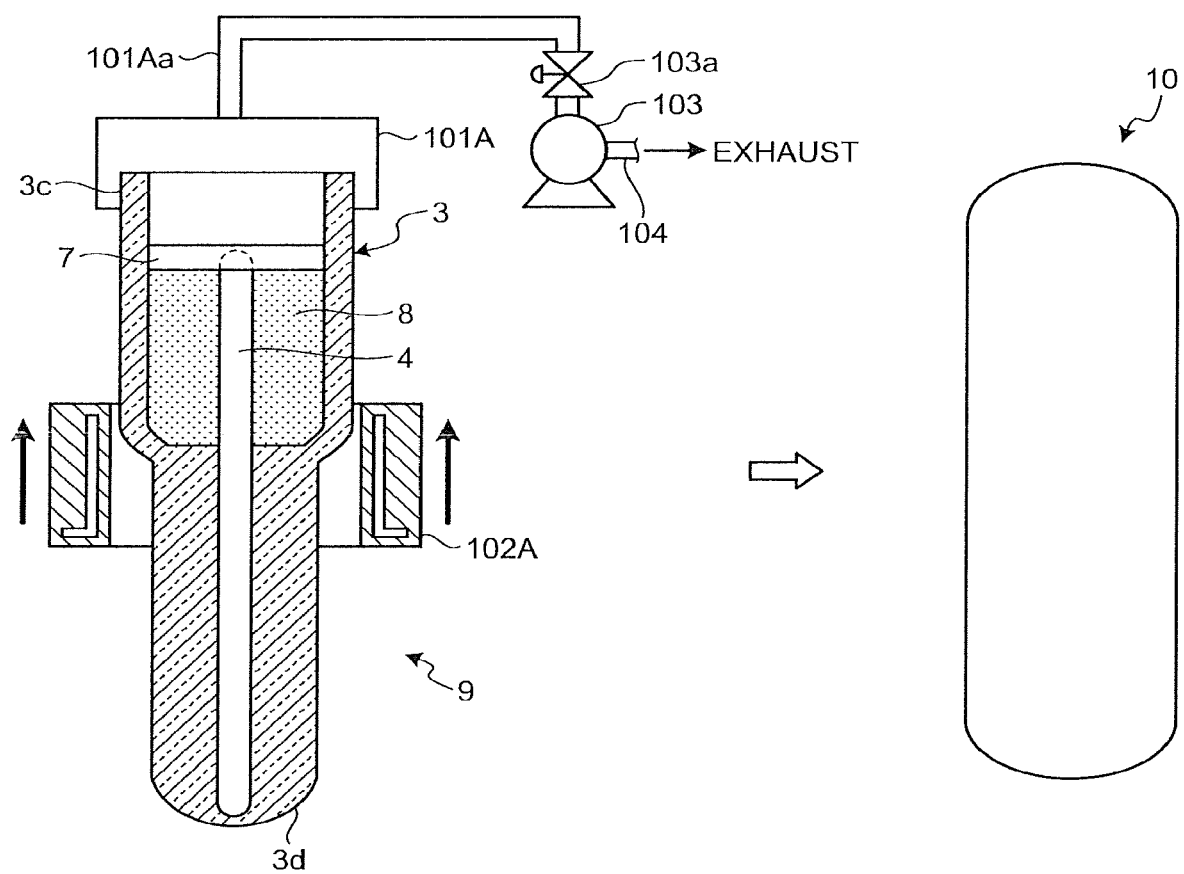
FIG. 6 is a schematic diagram for explaining a sintering process performed according to the first embodiment.

FIG. 6 is a schematic diagram for explaining the sintering process performed according to the first embodiment. In the sintering process performed at Step S108, the intermediate object 9 is heated while depressurizing the internal atmosphere of the glass pipe 3 through the holes formed in the second holding member 7; and the first holding member 6, the second holding member 7, and the filled glass particles 8 are consolidated. As a result, a transparent optical fiber preform 10 is manufactured.

More specifically, as illustrated in a state S7 in FIG. 6, firstly, a lid 101A is put on the upper end portion 3c of the glass pipe 3 in the intermediate object 9, and the intermediate object 9 is made airproof. To the lid 101A, a gas exhaust pipe 101Aa is connected that leads to the inside of the airproof intermediate object 9. To the gas exhaust pipe 101Aa are connected an exhaust valve 103a, a vacuum pump 103, and a gas exhaust pipe 104 in that order. Moreover, the intermediate object 9 is set in a heating furnace 102A. Then, the exhaust valve 103a is opened and, in that state, the internal gas of the intermediate object 9 is sucked using the vacuum pump 103 through the holes formed in the second holding member 7 from the side of the upper end portion 3c of the glass pipe 3 that is connected to the gas exhaust pipe 101Aa; and the sucked internal gas is discharged from the gas exhaust pipe 104. Because of the actions of the exhaust valve 103a and the vacuum pump 103, the internal atmosphere of the glass pipe 3 in the intermediate object 9 depressurized to a pressure equal to or smaller than a predetermined pressure.

In parallel to the operation of depressurizing the internal atmosphere, the heating furnace 102A heats the intermediate object 9 from the outer periphery of the glass pipe 3. At that time, the heating furnace 102A heats the intermediate object 9 from the lower end portion 3d to the upper end portion 3c in a sequential manner while moving from the lower end portion 3d to the upper end portion 3c along the outer periphery of the glass pipe 3. As a result, the glass pipe 3 melts and undergoes diameter reduction from the lower end portion 3d to the upper end portion 3c in a sequential manner; and the first holding member 6 in the lower end portion 3d (see FIG. 5) becomes consolidated and transparent, the filled glass particles 8 become consolidated and transparent from the lower end portion 3d toward the upper end portion 3c in a sequential manner, and the second holding member 7 in the upper end portion 3c becomes consolidated and transparent. As a result, the optical fiber preform 10 is manufactured from the intermediate object 9. The optical fiber preform 10 is a transparent preform that includes: the portion in which the glass pipe 3 melted and underwent diameter reduction; the portion in which the first holding member 6 and the second holding member 7 became transparent; the portion in which the filled glass particles 8 became transparent; and the core rod 4 integrated with the other portions.

Figure 7:
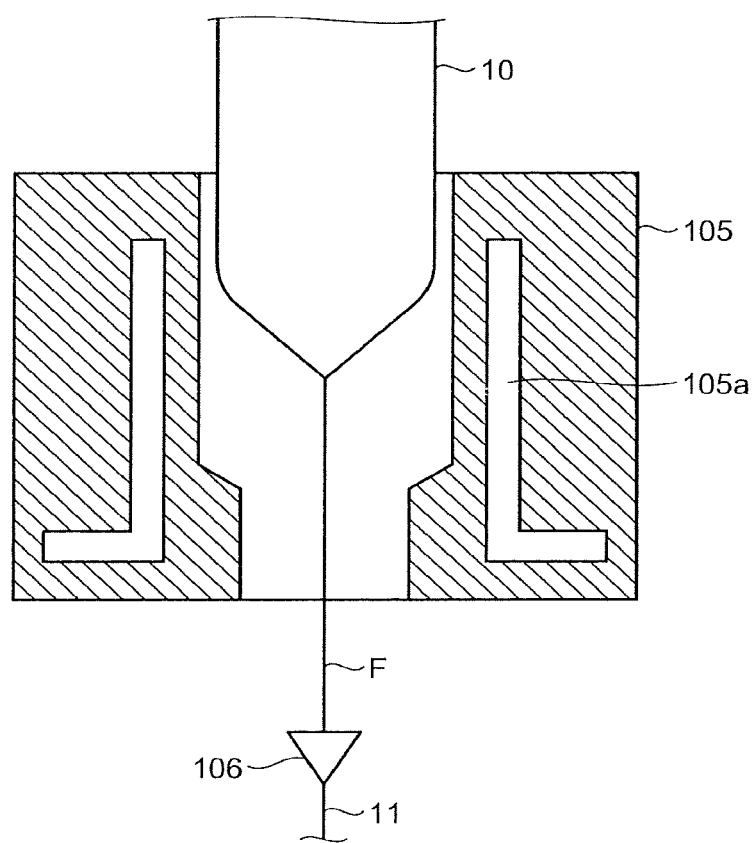
FIG. 7 is a schematic diagram for explaining a wiredrawing process performed using an optical fiber preform manufactured according to the first embodiment.

FIG. 7 is a schematic diagram for explaining the wiredrawing process performed using the optical fiber preform manufactured according to the first embodiment. In the wiredrawing process performed at Step S110, the optical fiber preform 10 manufactured by performing the sintering process is heat-melted and an optical fiber is wiredrawn. More specifically, as illustrated in FIG. 7, firstly, the optical fiber preform 10 is set in an optical fiber wiredrawing furnace 105. Then, while wiredrawing conditions such as the wiredrawing speed and the heating temperature are appropriately controlled, the optical fiber wiredrawing furnace 105 heats the lower end portion of the optical fiber preform 10 to, for example, 2200° C. using a heater 105a. As a result, the optical fiber wiredrawing furnace 105 melts the lower end portion of the optical fiber preform 10 and wiredraws an optical fiber F. The optical fiber F is in the bare wire state without having any coating on its outer periphery. Thus, the optical fiber F that is wiredrawn using the optical fiber wiredrawing furnace 105 is subjected to a coating operation using a die 106 that is disposed below the optical fiber wiredrawing furnace 105, and consequently the optical fiber 11 having the configuration illustrated in FIG. 1 is manufactured. In this way, the optical fiber 11 is obtained (Step S112), and it marks the end of the processes.

On the other hand, in the case in which an optical fiber is to be manufactured from the intermediate object 9, which is obtained as a result of the sintering process, without involving an optical fiber preform; the optical fiber manufacturing process includes a wiredrawing process (Step S111) illustrated in FIG. 2. In that case, since an optical fiber is to be manufactured from the intermediate object 9 (optical fiber at Step S107), after the sintering process is complete, the wiredrawing process (Step S111) is performed for wiredrawing an optical fiber from the intermediate object 9.

In the wiredrawing process performed at Step S111, the intermediate object 9 obtained as a result of performing the sintering process (refer to the state S6 illustrated in FIG. 5) is heated while depressurizing the internal atmosphere of the glass pipe 3 through the holes formed in the second holding member 7. Consequently, the glass pipe 3 and the core rod 4 are melted as well as the first holding member 6, the second holding member 7, and the filled glass particles 8 are consolidated; and an optical fiber is wiredrawn.

More specifically, in an identical manner to the state S7 illustrated in FIG. 6, the lid 101A is put on the upper end portion 3c of the glass pipe 3 in the intermediate object 9. As a result, the intermediate object 9 is made airproof from inside, and becomes connected to the exhaust valve 103a and the vacuum pump 103 via the gas exhaust pipe 101Aa. The intermediate object 9 is set in the optical fiber wiredrawing furnace 105 illustrated in FIG. 7 instead of the heating furnace 102A illustrated in FIG. 6. In that state, because of the actions of the exhaust valve 103a and the vacuum pump 103, the internal atmosphere of the glass pipe 3 in the intermediate object 9 is depressurized to a pressure equal to or smaller than a predetermined pressure. In parallel to the operation of depressurizing the internal atmosphere, while wiredrawing conditions such as the wiredrawing speed and the heating temperature are appropriately controlled, the optical fiber wiredrawing furnace 105 heats the intermediate object 9 using the heater 105a. As a result, the optical fiber wiredrawing furnace 105 melts the glass pipe 3 and the core rod 4 of the intermediate object 9; consolidates the first holding member 6, the second holding member 7, and the filled glass particles 8 of the intermediate object 9; and wiredrawn the optical fiber F. Subsequently, in an identical manner to the wiredrawing process performed at Step S110, a coating operation is performed using the die 106. As a result, the optical fiber 11 having the configuration illustrated in FIG. 1 is manufactured from the intermediate object 9. In this way, the optical fiber 11 is obtained (Step S113), and it marks the end of the processes.

Meanwhile, when a targeted manufactured product (a target) is an optical fiber preform, the processes from Step S101 to Step S106 illustrated in FIG. 2 are sequentially performed, so that the intermediate object 9 (see FIG. 5) is manufactured. Then, the sintering process at Step S108 is performed using the intermediate object 9, so that the optical fiber preform 10 (see FIG. 6) is manufactured. Herein, since the target is to manufacture an optical fiber preform (preform at Step S109), the wiredrawing process at Step S110 is not performed and the optical fiber preform 10 obtained as a result of the sintering process is treated as the target. In this way, the optical fiber preform 10 is obtained as the target (Step S114), and it marks the end of the processes.

Experiment Related to Bulk Density of Pair of Holding Members

Given below is the explanation of an experiment that was performed in regard to the bulk density of the pair of holding members 5 (more specifically, the first holding member 6 and the second holding member 7) used in the optical fiber manufacturing method according to the first embodiment. In this experiment, in the optical fiber manufacturing method as illustrated in FIG. 2 according to the first embodiment, the bulk density of the first holding member 6 and the second holding member 7 was set to be equal to 1.28 g/cm$^3$; the bulk density of the filled glass particles 8 in the pipe interior 3a of the glass pipe 3 was set to be equal to 1.25 g/cm$^3$; and the optical fiber 11 having the configuration illustrated in FIG. 1 was manufactured. At that time, the wiredrawing length (the overall length in the longitudinal direction) of the optical fiber 11 was set to be equal to 250 km.

Figure 8:
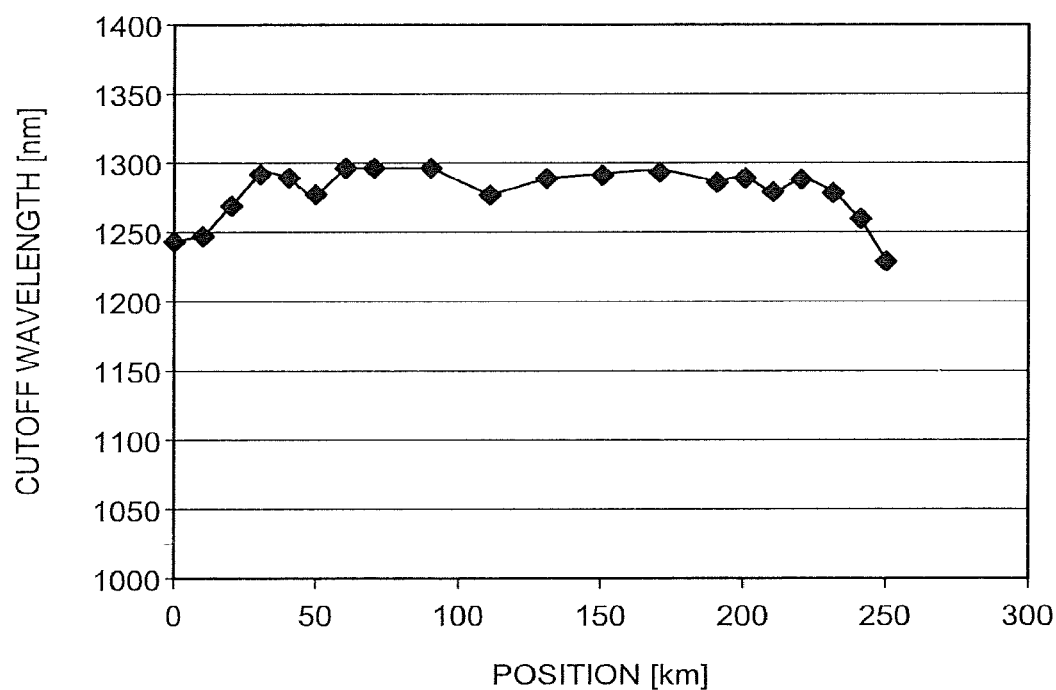
FIG. 8 is a diagram illustrating the relationship between the positions in the longitudinal direction and the cutoff wavelengths in an optical fiber manufactured in an experiment.

Subsequently, in the optical fiber 11 manufactured in the experiment, the cutoff wavelength at each position in the longitudinal direction was measured. FIG. 8 is a diagram illustrating the relationship between the positions in the longitudinal direction and the cutoff wavelengths in the optical fiber manufactured in the experiment. With reference to FIG. 8, "position" represents a position in the longitudinal direction with reference to the starting position of wiredrawing the optical fiber 11. That is, the position at 0 km represents the starting position of wiredrawing the optical fiber 11, and the position at 250 km represents the end position of wiredrawing the optical fiber 11. As illustrated in FIG. 8, in the optical fiber 11 manufactured in the experiment, the cutoff wavelength was excellent at all of the positions in the longitudinal direction of the optical fiber 11. That was believed to have happened because the bulk density of the first holding member 6 and the second holding member 7 was set to be comparable with the bulk density of the filled glass particles 8, thereby enabling holding down the variation in the core diameter across the entire area in the longitudinal direction of the optical fiber 11 within a predetermined permissible variation range (for example, within 5% of the core diameter in the middle portion of the longitudinal direction of the optical fiber 11).

Figure 9:
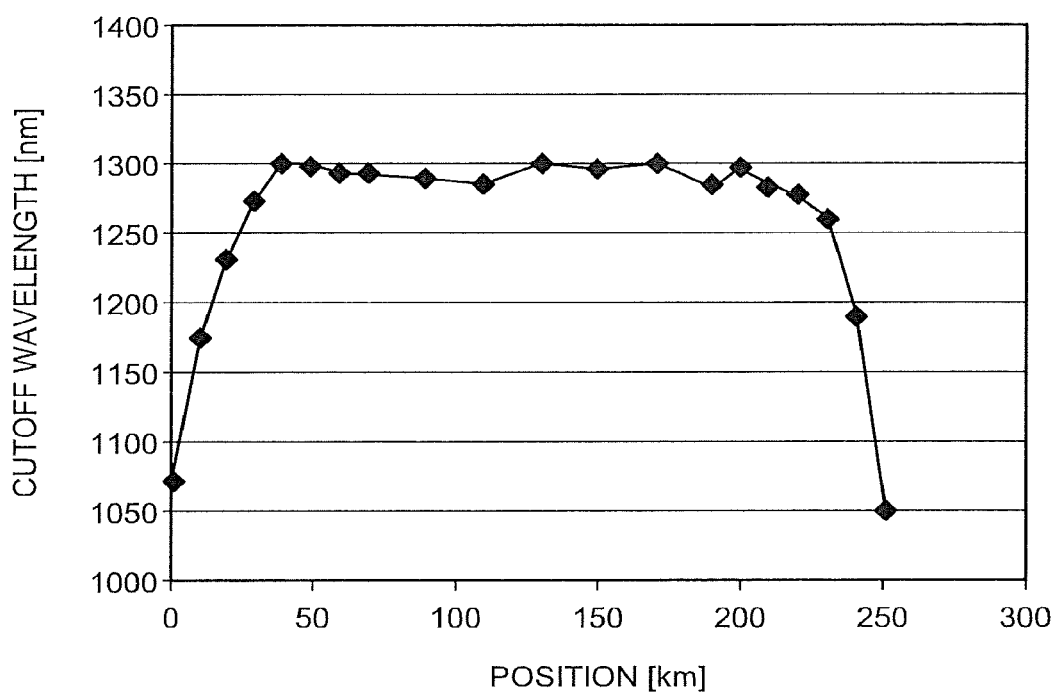
FIG. 9 is a diagram illustrating the relationship between the positions in the longitudinal direction and the cutoff wavelengths of an optical fiber in a comparative experiment.

On the other hand, in a comparative experiment performed with respect to the present experiment, in the optical fiber manufacturing method according to the first embodiment, the bulk density of the first holding member 6 and the second holding member 7 was set to 2.2 g/cm$^3$ but the other conditions were kept identical to the experiment explained above; and the optical fiber 11 was manufactured. FIG. 9 is a diagram illustrating the relationship between the positions in the longitudinal direction and the cutoff wavelengths of the optical fiber in the comparative experiment. As illustrated in FIG. 9, in the optical fiber 11 in the comparison experiment, as compared to the cutoff wavelength at the middle portion (the position at 125 km), the cutoff wavelengths substantially declined at the starting position of wiredrawing the optical fiber 11 (the position at 0 km) and the vicinity thereof (the positions at 0 km to 25 km) and substantially declined at the end position of wiredrawing the optical fiber 11 (the position at 250 km) and the vicinity thereof (the positions at 240 km to 250 km). The optical fiber portions in which the cutoff wavelengths decline in a substantial manner deviate from the permissible range of cutoff wavelengths in the optical fiber 11. Hence, those portions are cut off as defective portions. That leads to a decline in the yield ratio of the optical fiber.

Experiment Related to Dehydroxylation of Glass Particles

Given below is the example of an experiment that was performed in regard to dehydroxylation of the glass particles 8 filled in the pipe interior 3a of the glass pipe 3 during the optical fiber manufacturing method according to the first embodiment. In this experiment, as a result of the optical fiber manufacturing method according to the first embodiment (the dehydroxylation process performed at Step S105), the optical fiber 11 having the configuration illustrated in FIG. 1 was manufactured. Moreover, as a comparative example with respect to the optical fiber 11, an optical fiber comparison sample was manufactured by performing the processes identical to the manufacturing of the optical fiber 11, except for the dehydroxylation process at Step S105.

Figure 10:
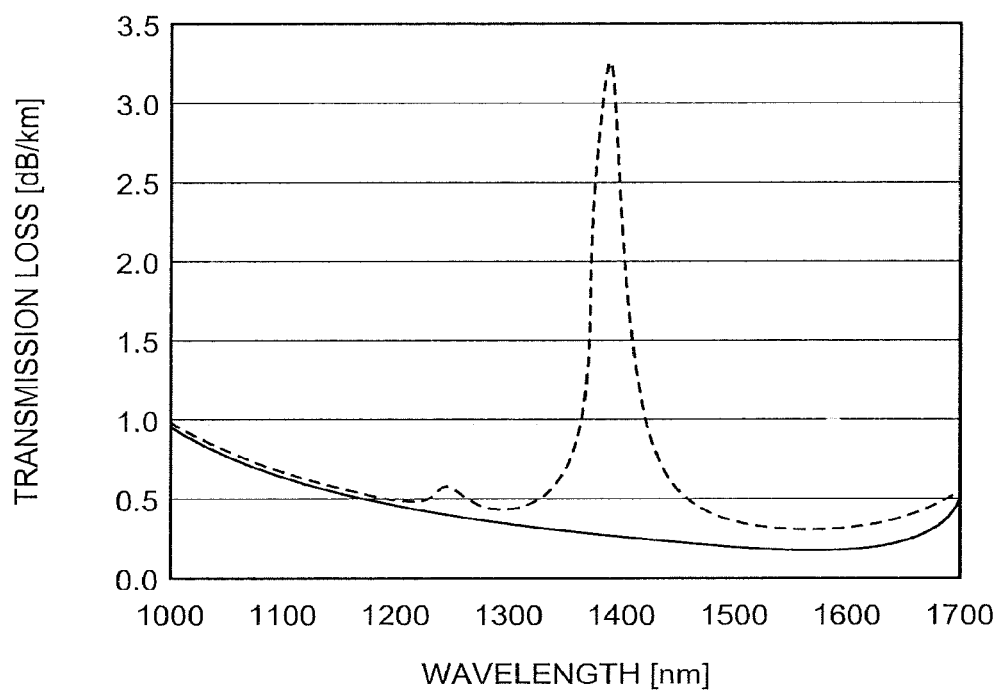
FIG. 10 is a diagram illustrating the relationship between the wavelength and the transmission loss of the light transmitted in the optical fiber manufactured in the present experiment.

Then, regarding the optical fiber 11 manufactured in the experiment and regarding the optical fiber comparison sample, the transmission loss at each wavelength of the transmitted light was measured (i.e., the loss wavelength characteristic of the optical fiber was measured). FIG. 10 is a diagram illustrating the relationship between the wavelength and the transmission loss of the light transmitted in the optical fiber manufactured in the experiment. In FIG. 10, the solid line represents the loss wavelength characteristics of the optical fiber 11 subjected to dehydroxylation, and the dashed line represents the loss wavelength characteristic of the optical fiber comparison sample (i.e., the optical fiber not subjected to dehydroxylation).

As indicated by the solid line in FIG. 10, the optical fiber 11 subjected to dehydroxylation had excellent loss wavelength characteristic across a wide wavelength region of the transmitted light. In contrast, in the optical fiber comparison sample, there is some wavelength region of the light (for example, the wavelength region between 1300 nm to 1500 nm) in which the transmission loss is notably high as compared to the optical fiber 11 subjected to dehydroxylation. From the comparison example, it could be confirmed that performing dehydroxylation of the filled glass particles 8 during the optical fiber manufacturing method is effective in enhancing the loss wavelength characteristic of the optical fiber.

In the optical fiber manufacturing method according to the first embodiment, the first holding member 6 and the second holding member 7, which hold the core rod 4 in a sandwiched manner from both ends in the longitudinal direction of the core rod 4 in the pipe interior 3a of the glass pipe 3, are set to have the bulk density within a predetermined range of the bulk density of the filling portion for the glass particles 8 that are filled in the gap between the inner wall face of the glass pipe 3 and the core rod 4; and the predetermined range is decided according to the permissible variation range for the core diameter in the longitudinal direction of the optical fiber to be manufactured. For that reason, in the sintering process performed at Step S108 or the wiredrawing processing performed at Step S111, the thermal contraction of the first holding member 6 and the second holding member 7 can be set to be comparable to the thermal contraction of the filled glass particles 8. As a result, the outer diameter of the optical fiber preform 10 obtained as a result of the sintering process or the outer diameter of the sintered body of the intermediate object 9 obtained as a result of the wiredrawing process can be stabilized in the longitudinal direction (more desirably, can be set to be constant). Since an optical fiber is wiredrawn in such a way that its outer diameter becomes constant, wiredrawing an optical fiber from either the optical fiber preform 10 or the sintered body of the intermediate object 9 having a stabilized outer diameter enables achieving as much reduction as possible in the variation of the core diameter of the optical fibers that are sequentially wiredrawn. Hence, because of the fact that the variation in the longitudinal direction of the post-wiredrawing optical fibers can be held down within the permissible variation range, optical fibers having a stable core diameter in the longitudinal direction can be manufactured with ease. Moreover, since the core rod 4 in the pipe interior 3a is held in a sandwiched manner in between the first holding member 6 and the second holding member 7, the relative position between the glass pipe 3 and the core rod 4 in the pipe interior 3a can be decided and fixed in an easy and accurate manner. That enables holding down the decentering of the core portion in the post-wiredrawing optical fibers.

Second Embodiment

Given below is the explanation of a second embodiment of the present disclosure. In an optical fiber manufacturing method according to the second embodiment, the glass pipe and the pair of holding members that are prepared in the preparation process performed at Step S101 illustrated in FIG. 2 are different than in the first embodiment, and the processes after the preparation process are performed using the glass pipe and the pair of holding members that are different than in the first embodiment. Apart from that, the remaining configuration is identical to the first embodiment, and the same constituent elements are referred to by the same reference numerals and their detailed explanation is not repeated.

Figure 11:
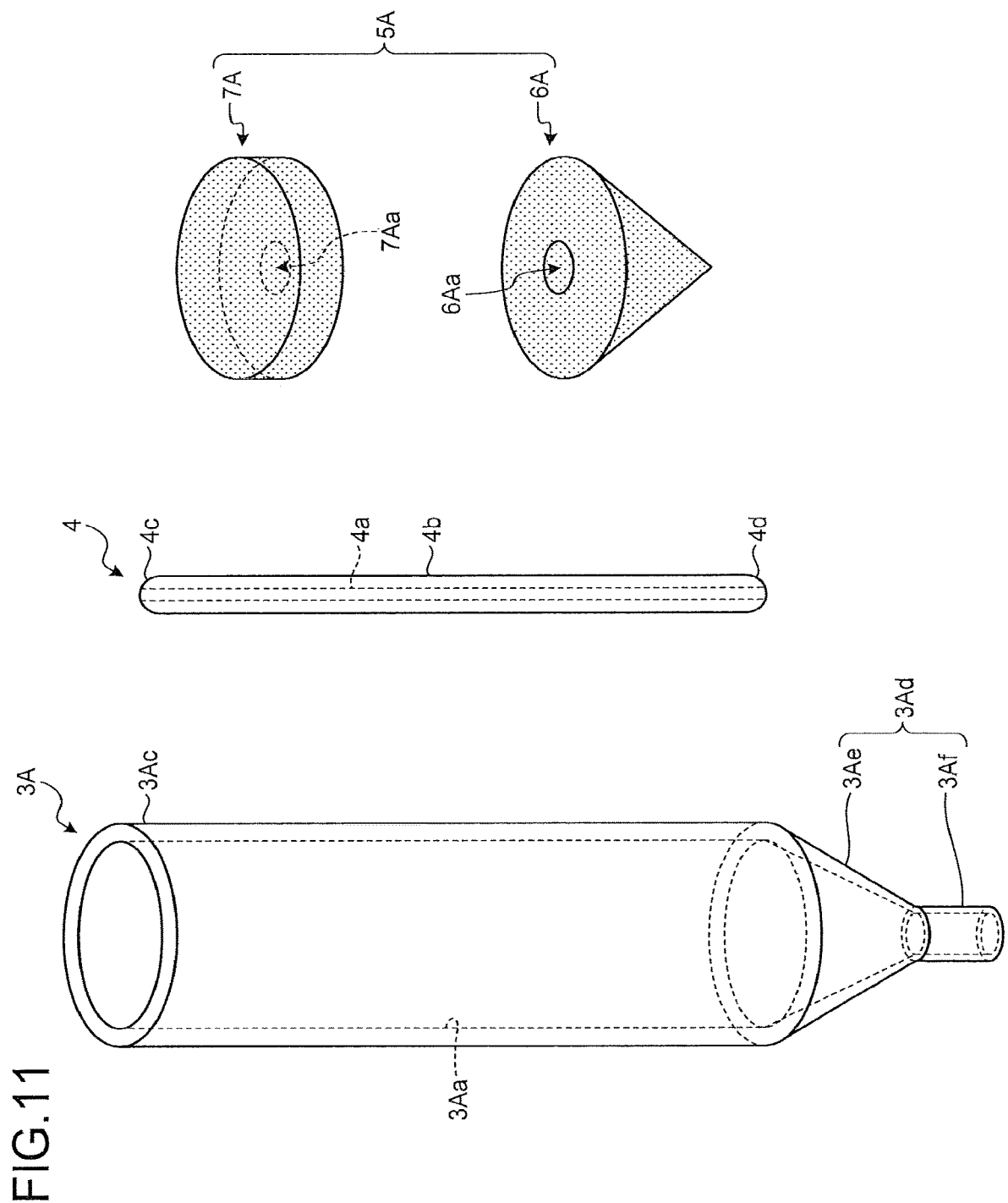
FIG. 11 is a schematic diagram for explaining the preparation process performed according to a second embodiment.

FIG. 11 is a schematic diagram for explaining the preparation process performed according to the second embodiment. In the preparation process performed at Step S101 according to the second embodiment, a glass pipe 3A, the core rod 4, and a pair of holding members 5A are prepared as illustrated in FIG. 11.

As illustrated in FIG. 11, the glass pipe 3A is a glass member having a cylindrical upper end portion 3Ac, a lower end portion 3Ad having a reduced diameter than the upper end portion 3Ac, and a continuously hollow pipe interior 3Aa in the longitudinal direction from the upper end portion 3Ac to the lower end portion 3Ad. The lower end portion 3Ad includes a hollow conical portion 3Ae that undergoes diameter reduction in a conical manner along the longitudinal direction of the glass pipe 3A, and a lower end cylindrical portion 3Af that has a smaller outer diameter and a smaller inner diameter than the upper end portion 3Ac. The upper end portion 3Ac and the lower end cylindrical portion 3Af have an opening to enable connection between the outside of the glass pipe 3A and the pipe interior 3Aa. In the second embodiment, for example, the glass pipe 3A is manufactured from a synthetic silica pipe that is a cylindrical pipe having the outer diameter of 150 mm and having the inner diameter of 130 mm and that does not have any dopant added thereto for refractive index adjustment; and one end portion of the cylindrical pipe is subjected to diameter reduction in the conical shape. Moreover, the conical portion 3Ae of the lower end portion 3Ad of the glass pipe 3A functions as an arresting portion for arresting the pair of holding members 5A, which are inserted in the pipe interior 3Aa from the side of the upper end portion 3Ac of the glass pipe 3A, in such a way that the pair of holding members 5A does not fall out from the side of the lower end portion 3Ad of the glass pipe 3A. In an identical manner to the first embodiment, the glass pipe 3A that is prepared in this manner constitutes the cladding portion 2 of the optical fiber 11 illustrated in FIG. 1.

The pair of holding members 5A holds the core rod 4 in the pipe interior 3Aa of the glass pipe 3A. The pair of holding members 5A is made of silica glass and has a plurality of holes formed thereon. In the second embodiment, as illustrated in FIG. 11, the pair of holding members 5A includes a first holding member 6A and a second holding member 7A. The first holding member 6A as well as the second holding member 7A is a glass powder molded body and is a glass porous body having a plurality of holes formed thereon. For example, the first holding member 6A and the second holding member 7A are manufactured and prepared according to the following method.

That is, silica powder (having the average particle diameter to be equal to or greater than 0.3 μm (for example, 4 μm)) synthesized according to gas-phase synthesis, a binding agent (polyvinyl alcohol (PVA)), and a plasticizing agent (glycerin) are put into deionized water and mixed together to form a silica particle slurry. Then, a spray dryer is used to perform spray drying of the silica particle slurry, and granules having the diameter of 120 μm are formed. Subsequently, the granules are filled in a shaping die made of rubber (and having the inner diameter of 160 mm) and pressure molding is performed using a hydrostatic pressure molding device to manufacture a pressure molded body. Then, the outer surface of the pressure molded body is machined using a lathe, and the outer diameter of the pressure molded body is set to be uniform at a predetermined size (for example, the same size as the inner diameter (=130 mm) of the glass pipe 3A).

Subsequently, from the pressure molded body, a conical pressure molded body (a conical molded body) is cut out that can get engaged in the inside of the conical portion 3Ae of the glass pipe 3A, and a columnar pressure molded body (a columnar molded body) is cut out that can get engaged on the side of the upper end portion 3Ac of the pipe interior 3Aa of the glass pipe 3A. Then, at the central portion on the base of the conical molded body, a hole (an engaging hole 6Aa) enabling engagement with the lower end portion 4d of the core rod 4 is formed by performing drilling such as shallow hole drilling. Moreover, at the central portion on one end face of the columnar molded body, a hole (an engaging hole 7Aa) enabling engagement with the upper end portion 4c of the core rod 4 is formed by performing drilling such as shallow hole drilling. Then, the post-drilling conical molded body and the post-drilling columnar molded body are kept in a degreasing unit for 10 hours at 500° C. under air atmosphere, and the binding agent and the plasticizing agent are decomposed. Subsequently, the temperature is raised to 1000° C., and the conical molded body and the columnar molded body are subjected to dehydroxylation and calcification. As a result, the conical molded body becomes the conical first holding member 6A and the columnar molded body becomes the columnar second holding member 7A.

The first holding member 6A and the second holding member 7A that are prepared as described above have a plurality of holes formed thereon. The holes represent venting holes enabling ventilation through the first holding member 6A and ventilation through the second holding member 7A. Moreover, as illustrated in FIG. 11, in the first holding member 6A and the second holding member 7A, the engaging holes 6Aa and 7Aa are respectively formed in the central part of the mutually opposite faces. In an identical manner to the engaging hole 6a according to the first embodiment, the engaging hole 6Aa is engaged with the lower end portion 4d of the core rod 4. Moreover, in an identical manner to the engaging hole 7a according to the first embodiment, the engaging hole 7Aa is engaged with the upper end portion 4c of the core rod 4. Meanwhile, the manufacturing of the first holding member 6A and the second holding member 7A is not limited to pressure molding, and alternatively can be manufactured according to some other method such as the slip-cast method or the extrusion method.

Herein, the bulk density of the first holding member 6A and the second holding member 7A is set to be within a predetermined range with reference to the bulk density of the filling portion in which glass particles (the glass particles 8 illustrated in FIG. 12 (described later) are filled in the pipe interior 3Aa of the glass pipe 3A. In an identical manner to the first embodiment, the predetermined range is decided according to the permissible variation range for the core diameter in the longitudinal direction of the optical fiber to be manufactured. The bulk density of the first holding member 6A and the second holding member 7A can be set within the predetermined range by appropriately adjusting the average particle diameter of the glass powder constituting the first holding member 6A and the second holding member 7A and by adjusting the molding conditions. In the second embodiment, the bulk density of the first holding member 6A and the second holding member 7A is equal to 1.28 g/cm$^3$, for example.

In the optical fiber manufacturing method according to the second embodiment, using the glass pipe 3A, the core rod 4, the first holding member 6A, and the second holding member 7A; the processes after the preparation process (the processes from Step S102 to Step S111 illustrated in FIG. 2) are appropriately performed. FIG. 12 is a schematic diagram for explaining the rod setup process, the particle filling process, and the rod holding process performed according to the second embodiment.

Figure 12:
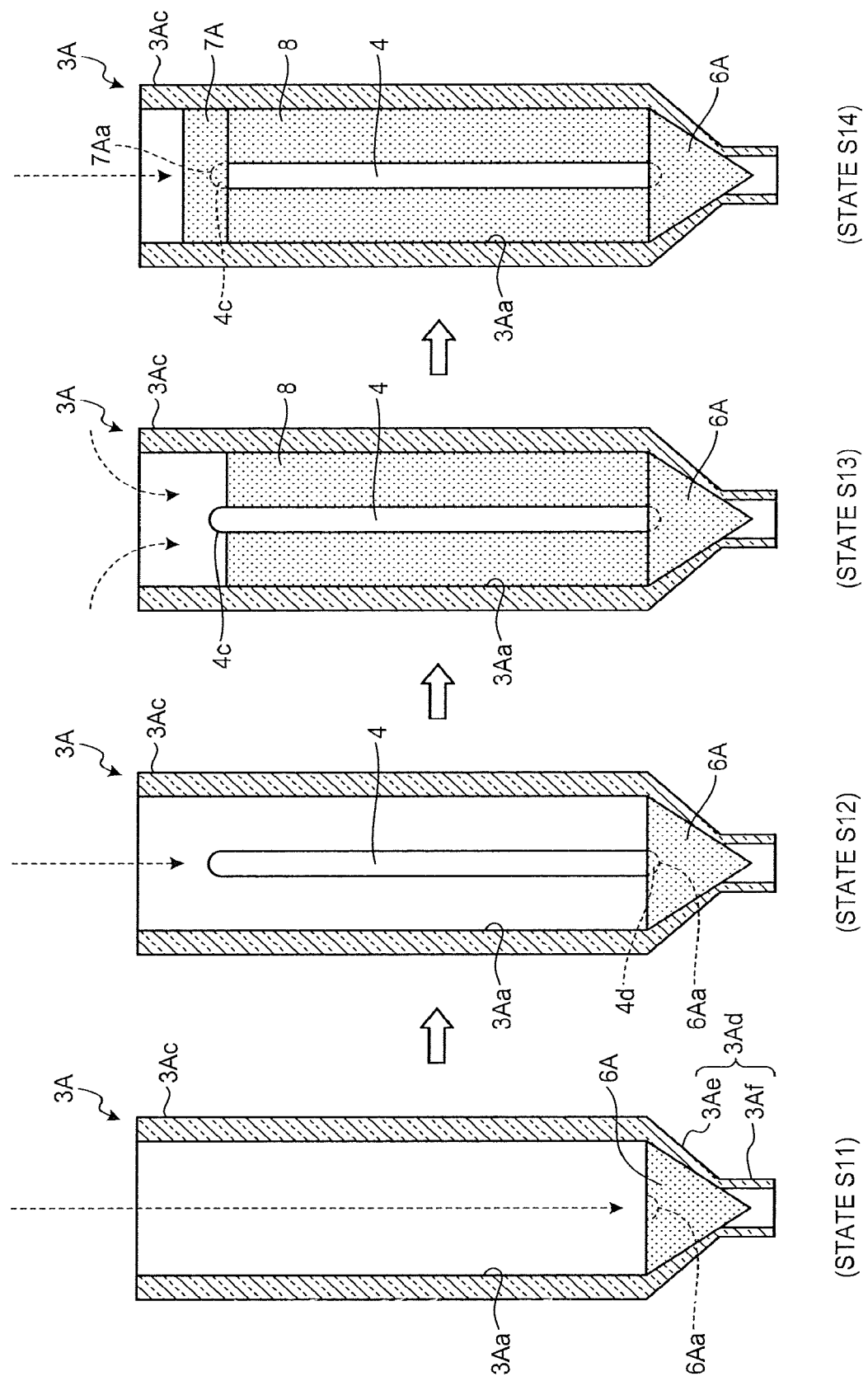
FIG. 12 is a schematic diagram for explaining the rod setup process, the particle filling process, and the rod holding process performed according to the second embodiment.

In the rod setup process performed at Step S102 according to the second embodiment, as illustrated in a state S11 in FIG. 12, firstly, the conical first holding member 6A is placed in the pipe interior 3Aa of the glass pipe 3A. At that time, with the engaging hole 6Aa facing upward (toward the upper end portion 3Ac of the glass pipe 3A), the first holding member 6A is inserted in the pipe interior 3Aa from the side of the upper end portion 3Ac of the glass pipe 3A, and is further inserted up to the inside of the lower end portion 3Ad along the inner wall face of the glass pipe 3A. Then, the first holding member 6A is arrested and supported by the conical portion 3Ae. In that supported state, the apex portion of the first holding member 6A is inserted inside the lower end cylindrical portion 3Af, and the lateral face of the first holding member 6A is engaged with the inner wall face of the conical portion 3Ae. As a result, the first holding member 6A is placed in the pipe interior 3Aa without falling out from the lower end portion 3Ad of the glass pipe 3A.

Subsequently, as illustrated in a state S12 illustrated in FIG. 12, the core rod 4 is inserted in the pipe interior 3Aa from the side of the upper end portion 3Ac of the glass pipe 3A, and the lower end portion 4d of the core rod 4 is engaged with the engaging hole 6Aa formed on the first holding member 6A. As a result, the core rod 4 is placed in the pipe interior 3Aa of the glass pipe 3A in such a way that the core rod 4 is supported by the first holding member 6A.

In the particle filling process performed at Step S103 according to the second embodiment, as illustrated in a state S13 in FIG. 12, the glass particles 8 are inserted in plurality in the pipe interior 3Aa from the side of the upper end portion 3Ac of the glass pipe 3A. As a result, in the area in the pipe interior 3Aa spanning from the top face of the first holding member 6A (the base of the cone) in the pipe interior 3Aa up to the portion close to the upper end portion 4c of the core rod 4, the gap between the inner wall face of the glass pipe 3A and the core rod 4 is filled with the glass particles 8. Meanwhile, the holes formed in the first holding member 6A are sufficiently small as compared to the glass particles 8. Hence, the filled glass particles 8 do not fall out from the glass pipe 3A to the outside of the first holding member 6A. The same explanation is applicable to the second holding member 7A.

In the rod holding process performed at Step S104 according to the second embodiment, as illustrated in a state S14 in FIG. 12, with the engaging hole 7Aa facing downward (toward the first holding member 6A of the pipe interior 3Aa), the second holding member 7A is inserted in the pipe interior 3Aa from the side of the upper end portion 3Ac of the glass pipe 3A. Then, the second holding member 7A traps the filled glass particles 8 in the pipe interior 3Aa and causes engagement of the engaging hole 7Aa with the upper end portion 4c of the core rod 4. As a result, the core rod 4 and the filled glass particles 8 are placed in the area enclosed by the inner wall face of the glass pipe 3A, the first holding member 6A, and the second holding member 7A. At the same time, the core rod 4 is held in a sandwiched manner in between the second holding member 7A and the first holding member 6A. Hence, the relative position of the core rod 4 with respect to the glass pipe 3A is fixed due to the first holding member 6A and the second holding member 7A.

Meanwhile, the bulk density of the filling portion for the glass particles 8 is comparable with (is within the predetermined range of) the bulk density of the first holding member 6A and the second holding member 7A and, for example, is equal to 1.25 g/cm$^3$. Moreover, it is desirable that the glass particles 8 are made of the same type of glass powder as the glass powder used in the first holding member 6A and the second holding member 7A (for example, pure silica glass).

Figure 13:
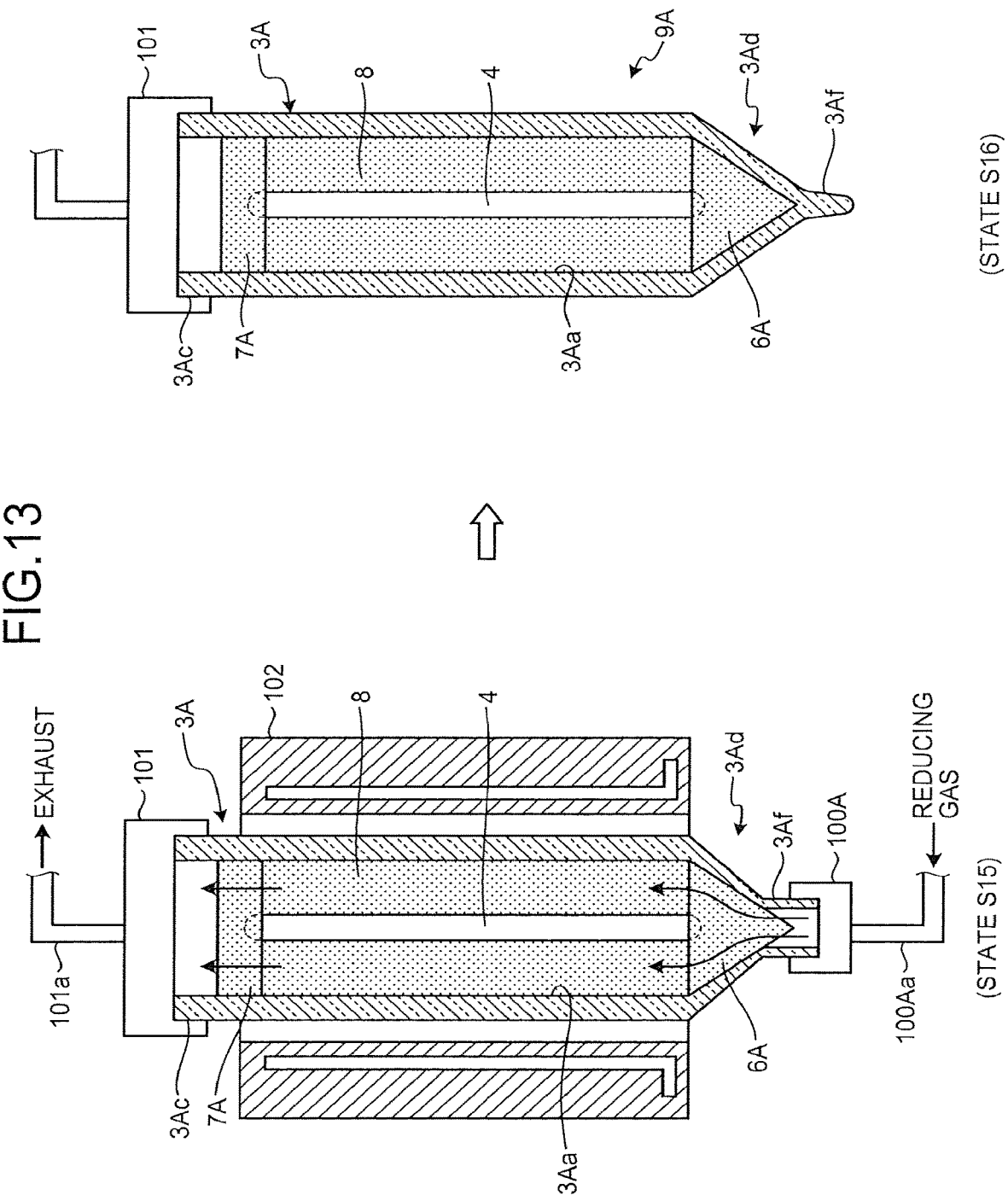
FIG. 13 is a schematic diagram for explaining the dehydroxylation process and the sealing process performed according to the second embodiment.

FIG. 13 is a schematic diagram for explaining the dehydroxylation process and the sealing process performed according to the second embodiment. In the dehydroxylation process performed at Step S105 according to the second embodiment, as illustrated in a state S15 in FIG. 13, firstly, lids 101 and 100A are put on the upper end portion 3Ac and the lower end portion 3Ad (more specifically, the lower end cylindrical portion 3Af), respectively, of the glass pipe 3A; and the pipe interior 3Aa including the core rod 4 and the filled glass particles 8 is made airproof. To the lid 100A, a gas introduction pipe 100Aa is connected that leads to the airproof pipe interior 3Aa. Moreover, the glass pipe 3A is set in the heating furnace 102. Then, a reducing gas such as chlorine gas is supplied to the pipe interior 3Aa from the gas introduction pipe 100Aa. The reducing gas passes from the lower end portion 3Ad of the glass pipe 3A through the holes formed in the first holding member 6A, and enters the filling portion for the glass particles 8 in the pipe interior 3Aa. Then, while coming in contact with each glass particle 8 in the pipe interior 3Aa, the reducing gas passes through the gaps among the glass particles 8 in the filling portion and flows toward the upper end portion 3Ac of the glass pipe 3A. Then, the reducing gas flows to the upper end portion 3Ac of the glass pipe 3A through the holes formed in the second holding member 7A, and is discharged from the gas exhaust pipe 101a in an identical manner to the first embodiment.

Simultaneous to the circulation of the reducing gas, the heating furnace 102 heats, from the outer periphery of the glass pipe 3A, that portion of the glass pipe 3A which at least includes the filling portion for the glass particles 8. As a result, the filled glass particles 8 are subjected to dehydroxylation in an identical manner to the first embodiment.

In the sealing process performed at Step S106 subsequent to the dehydroxylation process, according to the second embodiment, as illustrated in a state S16 in FIG. 13, one end portion of the glass pipe 3A (in the second embodiment, the lower end cylindrical portion 3Af of the lower end portion 3Ad) is heat-melted and subjected to diameter reduction. Hence, that end portion of the glass pipe 3A is sealed, an intermediate object 9A is manufactured. The intermediate object 9A is a structure in which the pipe interior 3Aa includes the core rod 4, the first holding member 6A, the second holding member 7A, and the post-dehydroxylation filled glass particles 8; and in which one end of the glass pipe 3A is sealed. In the intermediate object 9A, the lid 101 is appropriately removed from the other end of the glass pipe 3A (in the second embodiment, the upper end portion 3Ac), and is used in the processes performed after the sealing process.

Figure 14:
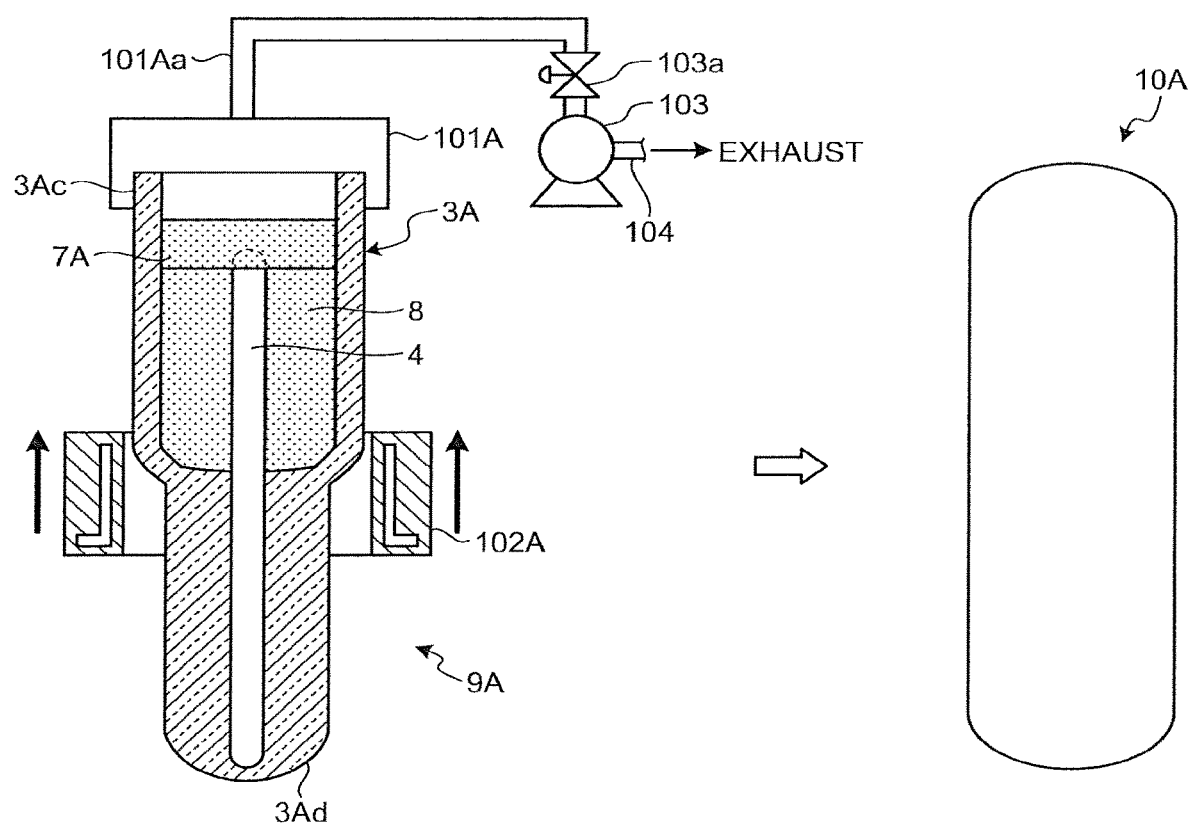
FIG. 14 is a schematic diagram for explaining the sintering process performed according to the second embodiment.

FIG. 14 is a schematic diagram for explaining the sintering process performed according to the second embodiment. In the sintering process performed at Step S108 according to the second embodiment, as illustrated in a state S17 in FIG. 14, firstly, the lid 101A is put on the upper end portion 3Ac of the glass pipe 3A in the intermediate object 9A, and the inside of the intermediate object 9A is made airproof. Moreover, the intermediate object 9A is set in the heating furnace 102A. Then, the exhaust valve 103a is opened and, in that state, the internal gas of the intermediate object 9A is sucked using through the holes formed in the second holding member 7A from the side of the upper end portion 3Ac of the glass pipe 3A that is connected to the gas exhaust pipe 101Aa; and the sucked internal gas is discharged from the gas exhaust pipe 104. As a result, the internal atmosphere of the glass pipe 3A in the intermediate object 9A is depressurized to a pressure equal to or smaller than a predetermined pressure in an identical manner to the first embodiment.

In parallel to the operation of depressurizing the internal atmosphere, the heating furnace 102A sequentially heats the intermediate object 9A from the lower end portion 3Ad up to the upper end portion 3Ac in an identical manner to the first embodiment. As a result, the first holding member 6A in the lower end portion 3Ad (see FIG. 13) and the second holding member 7A in the upper end portion 3Ac are consolidated and become transparent. Meanwhile, the glass pipe 3A melts and undergoes dimension reduction in an identical manner to the first embodiment. The filled glass particles 8 are consolidated and become transparent in an identical manner to the first embodiment. As a result, from the intermediate object 9A, an optical fiber preform 10A is manufactured that has an identical configuration to the optical fiber preform 10 according to the first embodiment.

Regarding the wiredrawing process performed at Step S110 according to the second embodiment, except for the fact that the optical fiber preform 10A according to the second embodiment is used in place of the optical fiber preform 10 (see FIG. 7) according to the first embodiment, the wiredrawing process is performed in an identical manner to the first embodiment. As a result, the optical fiber 11 having the configuration illustrated in FIG. 1 is manufactured. In this way, the optical fiber 11 is obtained (Step S112), and it marks the end of the processes.

On the other hand, regarding the wiredrawing process performed at Step S111 according to the second embodiment, except for the fact that the intermediate object 9A according to the second embodiment is used in place of the intermediate object 9 (see FIG. 6) according to the first embodiment, the wiredrawing process is performed in an identical manner to the first embodiment. As a result, the optical fiber 11 is manufactured from the intermediate object 9. In this way, the optical fiber 11 is obtained (Step S113), and it marks the end of the processes. Meanwhile, if the target according to the second embodiment is to manufacture an optical fiber preform, then the optical fiber preform 10A (see FIG. 14) manufactured as a result of performing the sintering process is treated as the target. In this way, the optical fiber preform 10A is obtained as the target (Step S114), and it marks the end of the processes.

Experiment Related to Average Particle Diameter of Glass Porous Body

Given below is the explanation about an experiment that was performed in regard to the average particle diameter of the glass porous body used in the optical fiber manufacturing method according to the second embodiment, that is, an experiment that was performed in regard to the average particle diameter of the glass powder constituting the first holding member 6A and the second holding member 7A (hereinafter, called an average particle diameter Da). In this experiment, in the optical fiber manufacturing method according to the second embodiment, the average particle diameter Da was varied in various ways and accordingly the first holding members 6A and the second holding members 7A were prepared; and samples #1 to #9 of the optical fiber 11 were manufactured using the first holding members 6A and the second holding members 7A.

The sample #1 is about the optical fiber 11 manufactured using the first holding member 6A and the second holding member 7A having the average particle diameter Da of 0.02 µm. The sample #2 is about the optical fiber 11 manufactured using the first holding member 6A and the second holding member 7A having the average particle diameter Da of 0.04 µm. The sample #3 is about the optical fiber 11 manufactured using the first holding member 6A and the second holding member 7A having the average particle diameter Da of 0.3 µm. The sample #4 is about the optical fiber 11 manufactured using the first holding member 6A and the second holding member 7A having the average particle diameter Da of 1 µm. The sample #5 is about the optical fiber 11 manufactured using the first holding member 6A and the second holding member 7A having the average particle diameter Da of 2 µm. The sample #6 is about the optical fiber 11 manufactured using the first holding member 6A and the second holding member 7A having the average particle diameter Da of 3.9 µm. The sample #7 is about the optical fiber 11 manufactured using the first holding member 6A and the second holding member 7A having the average particle diameter Da of 10 µm. The sample #8 is about the optical fiber 11 manufactured using the first holding member 6A and the second holding member 7A having the average particle diameter Da of 15 µm. The sample #9 is about the optical fiber 11 manufactured using the first holding member 6A and the second holding member 7A having the average particle diameter Da of 30 µm.

Then, regarding each of the samples #1 to #9 according to the experiment, the transmission loss was measured when the light having the wavelength of 1385 nm was transmitted (herein, called the 1385 nm transmission loss). In Table 1 is illustrated the relationship between the average particle diameter of the first holding member 6A and the second holding member 7A and the measurement result of the 1385 nm transmission loss of each of the samples #1 to #9 in the experiment.

TABLE 1

|  | Average particle diameter Da [µm] | 1385 nm transmission loss [dB/km] |
| --- | --- | --- |
| sample #1 | 0.02 | 22 |
| sample #2 | 0.04 | 3.5 |
| sample #3 | 0.3 | 0.4 |
| sample #4 | 1 | 0.35 |
| sample #5 | 2 | 0.31 |
| sample #6 | 3.9 | 0.29 |
| sample #7 | 10 | 0.28 |

TABLE 1-continued

| | Average particle diameter Da [μm] | 1385 nm transmission loss [dB/km] |
|---|---|---|
| sample #8 | 15 | 0.29 |
| sample #9 | 30 | 0.28 |

As is clear from Table 1, it was confirmed that, when the average particle diameter Da falls below 0.3 μm, there is a notable increase in the 1385 nm transmission loss. It implies that, in the optical fiber manufacturing method using the first holding member 6A and the second holding member 7A having the average particle diameter. Da smaller than 0.3 μm, there is only a small effect of purification of the glass particles 8 in the dehydroxylation process performed at Step S105. The reason for that can be thought to be as follows: when the average particle diameter Da is smaller than 0.3 μm, the gaps (vacancy diameter) among the constituent particles (glass powder) in the first holding member 6A and the second holding member 7A became excessively small, so that the reducing gas could not sufficiently pass through the first holding member 6A and the second holding member 7A. Hence, from the perspective of achieving and enhancing the effect of purification of the glass particles 8 in the dehydroxylation process performed at Step S105, it is desirable that the average particle diameter Da is equal to or greater than 0.3 μm.

Moreover, also in the case in which the first holding member 6A as well as the second holding member 7A included molding portions of glass powder having the average particle diameter Da equal to or greater than 0.3 μm in some part in a radial direction, it was possible to achieve the circulation of the reducing gas. Hence, the correlation between the average particle diameter Da and the 1385 nm transmission loss was identical to the correlation given in Table 1. Thus, the glass porous body used in the first holding member 6A and the second holding member 7A need not necessarily include the molding portion of glass powder having the average particle diameter Da equal to or greater than 0.3 μm throughout. That is, as long as some portion in a radial direction (the same direction as a radial direction of the glass pipe 3A) of the glass porous body includes molding portions of glass powder having the average particle diameter Da equal to or greater than 0.3 μm, it serves the purpose.

In the optical fiber manufacturing method according to the second embodiment, the first holding member 6A and the second holding member 7A, which hold the core rod 4 in a sandwiched manner from both ends in the longitudinal direction of the core rod 4 in the pipe interior 3Aa of the glass pipe 3A, are glass powder molded bodies and are glass porous bodies having a plurality of holes (venting holes) formed thereon; and the bulk density of the glass porous bodies is set to be identical to the first embodiment. Hence, not only the same effects can be achieved as the effects achieved in the first embodiment, but the first holding member 6A and the second holding member 7A become easier to handle and can be prepared at low cost as compared to the holding members made of glass plates. Moreover, in the pipe interior 3Aa, since the core rod 4 is held in a sandwiched manner in between the first holding member 6A and the second holding member 7A, the core rod 4 can be placed in the pipe interior 3Aa more easily, and the relative position of the core rod 4 in the pipe interior 3Aa can be fixed with respect to the glass pipe 3A more easily and with high accuracy. That enables holding down with ease the decentering of the core portion in the post-wiredrawing optical fiber.

Moreover, the lower end portion 3Ad of the glass pipe 3A includes the conical portion 3Ae, and the conically-molded first holding member 6A is placed in the pipe interior 3Aa in an engaged manner with the conical portion 3Ae. Hence, the central axis in the longitudinal direction of the glass pipe 3A and the central axis in the height direction of the first holding member 6A can be easily matched, and hence it becomes possible to facilitate enhancement in the ease and the accuracy of positioning of the core rod 4. Furthermore, since the glass powder constituting the first holding member 6A and the second holding member 7A is set to have the average particle diameter Da equal to or greater than 0.3 μm, the effect of purification of the glass particles 8 in the dehydroxylation process performed at Step S105 can be achieved with ease.

Third Embodiment

Figure 15:
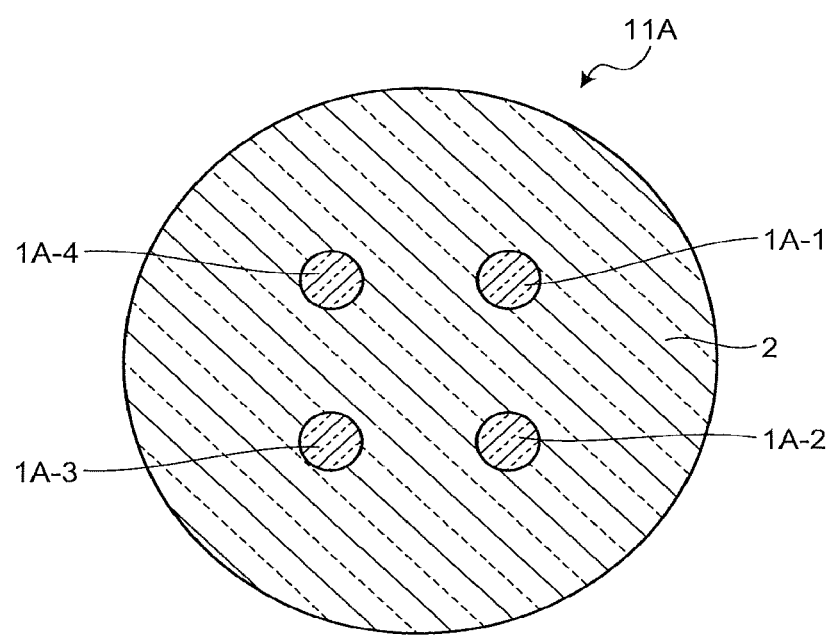
FIG. 15 is a schematic cross-sectional view of an exemplary configuration of an optical fiber manufactured by an optical fiber manufacturing method according to a third embodiment of the present disclosure.

Given below is the explanation of a third embodiment of the present disclosure. FIG. 15 is a schematic cross-sectional view of an exemplary configuration of an optical fiber manufactured by an optical fiber manufacturing method according to the third embodiment of the present disclosure. An optical fiber 11A according to the third embodiment is made of silica based glass and, as illustrated in FIG. 15, represents what is called a multicore fiber that includes a plurality of core portions 1A-1 to 1A-4 (in the third embodiment, four core portions 1A-1 to 1A-4 arranged in a square lattice) and the cladding portion 2 that is formed on the outer periphery of the core portions 1A-1 to 1A-4. Moreover, although not illustrated in FIG. 15, there is a coating formed on the outer periphery of the cladding portion 2. The coating is same as the coating usually used in optical fibers.

Each of the core portions 1A-1 to 1A-4 is made of silica glass added with $GeO_2$. The cladding portion 2 is made of pure silica glass in an identical manner to the first embodiment.

Given below is the explanation of the optical fiber manufacturing method according to the third embodiment of the present disclosure. In the optical fiber manufacturing method according to the third embodiment, the number of core rods prepared in the preparation process performed at Step S101 illustrated in FIG. 2 is different than in the second embodiment, and the number of engaging holes formed in the pair of holding members is different than in the second embodiment; and such core rods and the pair of holding members are used in the processes performed after the preparation process. Apart from that, the remaining configuration is identical to the second embodiment, and the same constituent elements are referred to by the same reference numerals and their detailed explanation is not repeated.

Figure 16:
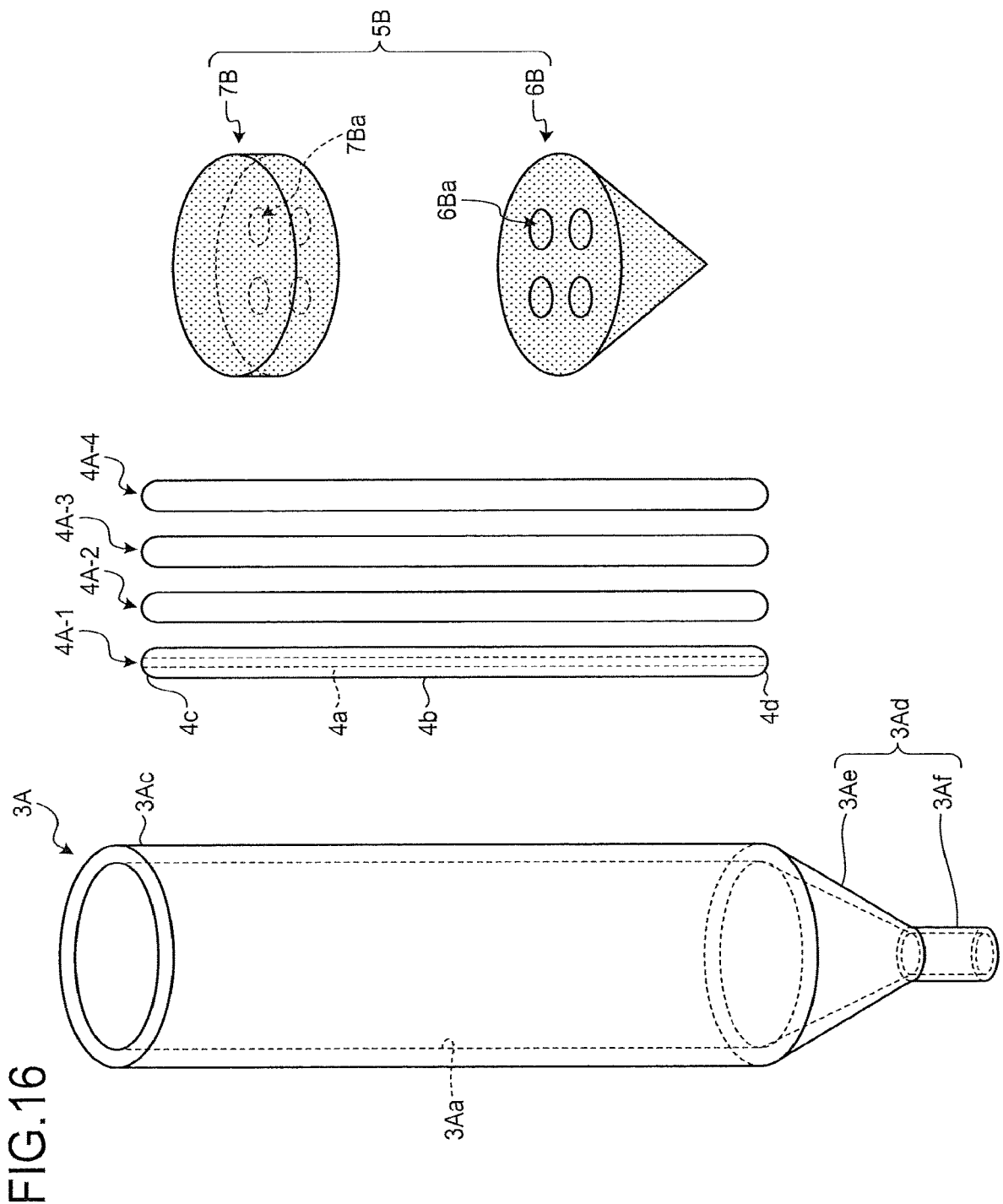
FIG. 16 is a schematic diagram for explaining the preparation process performed according to the third embodiment.

FIG. 16 is a schematic diagram for explaining the preparation process performed according to the third embodiment. In the preparation process performed at Step S101 according to the third embodiment, the glass pipe 3A, a plurality of core rods (in the third embodiment, four core rods) 4A-1 to 4A-4, and a pair of holding members 5B are prepared.

Each of the core rods 4A-1 to 4A-4 includes the core forming portion 4a and the cladding forming portion 4b in an identical manner to the core rod 4 according to the first and second embodiments. The core rods 4A-1 to 4A-4 can be manufactured and prepared in an identical manner to the core rod 4 as described earlier. In the third embodiment, each of the core rods 4A-1 to 4A-4 is set to have the outer diameter of the cladding forming portion 4b to be equal to 2.5 times of the diameter of the core forming portion 4a, and is extended to have the outer diameter of 20 mm.

The pair of holding members 5B holds the core rods 4A-1 to 4A-4 in the pipe interior 3Aa of the glass pipe 3A. The pair of holding members 5B is made of silica glass and has a plurality of holes formed therein. As illustrated in FIG. 16, the pair of holding members 5B includes a first holding member 6B and a second holding member 7B.

The first holding member 6B as well as the second holding member 7B is a glass powder molded body and is a glass porous body having a plurality of holes formed thereon. For example, the first holding member 6B has a plurality of engaging holes 6Ba (in the third embodiment, the same number (=4) as the number of core rods 4A-1 to 4A-4) formed on the face opposite to the second holding member 7B (the base of the cone). Apart from that, the first holding member 6B is identical to the first holding member 6A according to the second embodiment. According to the identical method to the manufacturing method of the first holding member 6A, the first holding member 6B is manufactured and prepared in a conical shape, with the engaging holes 6Ba formed on the base in a predetermined arrangement (in the third embodiment, in the arrangement of a square lattice). In an identical manner to the engaging hole 6Aa according to the second embodiment, the engaging holes 6Ba get engaged with the lower end portions of the core rods 4A-1 to 4A-4 (as an example, the lower end portion 4d of the core rod 4A-1). The second holding member 7B has a plurality of engaging holes 7Ba (in the third embodiment, the same number of holes as the number of core rods 4A-1 to 4A-4) formed on the face opposite to the first holding member 6B (formed on one end face of the column). Apart from that, the second holding member 7B is identical to the second holding member 7A according to the second embodiment. According to the identical method to the manufacturing method of the second holding member 7A, the second holding member 7B is manufactured and prepared in a columnar shape, with the engaging holes 7Ba formed in a predetermined arrangement (in the third embodiment, the arrangement of a square lattice). In an identical manner to the engaging hole 7Aa according to the second embodiment, the engaging holes 7Ba get engaged with the upper end portions of the core rods 4A-1 to 4A-4 (as an example, the upper end portion 4c of the core rod 4A-1).

Herein, the bulk density of the first holding member 6B and the second holding member 7B is set to be within a predetermined range with reference to the bulk density of the filling portion in which glass particles (the glass particles 8 illustrated in FIG. 17 described later) are filled in the pipe interior 3Aa of the glass pipe 3A. In an identical manner to the first and second embodiments, the predetermined range is decided according to the permissible variation range for the core diameter in the longitudinal direction of the optical fiber to be manufactured. The bulk density of the first holding member 6B and the second holding member 7B can be set within the predetermined range according to the adjustment method identical to the second embodiment. In the third embodiment, the bulk density of the first holding member 6B and the second holding member 7B is equal to 1.28 g/cm$^3$, for example.

Figure 17:
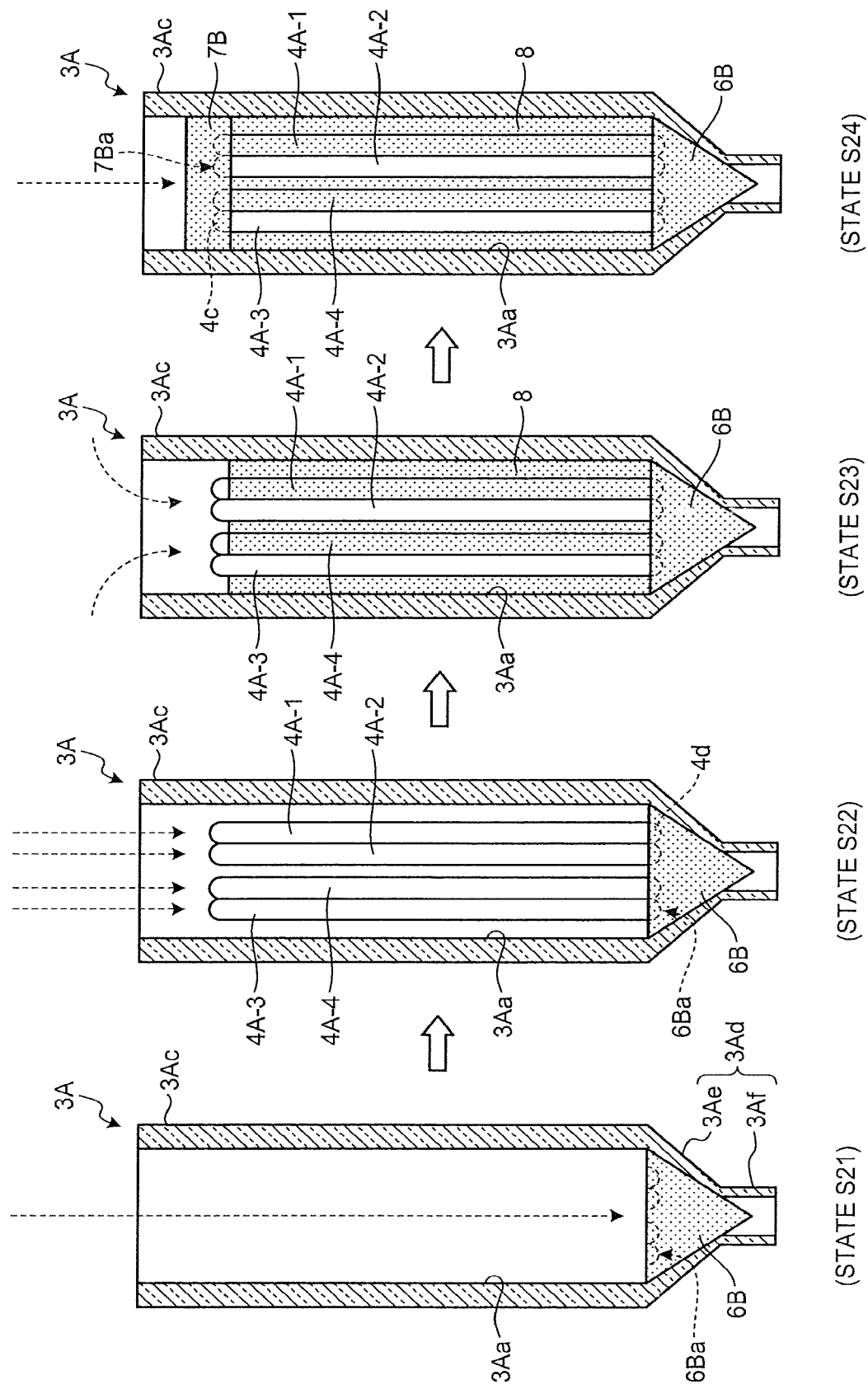
FIG. 17 is a schematic diagram for explaining the rod setup process, the particle filling process, and the rod holding process performed according to the third embodiment.

In the optical fiber manufacturing method according to the third embodiment, using the glass pipe 3A, the core rods 4A-1 to 4A-4, the first holding member 6B, and the second holding member 7B; the processes after the preparation process (the processes from Step S102 to Step S111 illustrated in FIG. 2) are appropriately performed. FIG. 17 is a schematic diagram for explaining the rod setup process, the particle filling process, and the rod holding process performed according to the third embodiment.

In the rod setup process performed at Step S102 according to the third embodiment, as illustrated in a state S21 in FIG. 17, firstly, the conical first holding member 6B is placed in the pipe interior 3Aa of the glass pipe 3A. At that time, with the engaging hole 6Ba facing upward (toward the upper end portion 3Ac of the glass pipe 3A), the first holding member 6B is inserted in the pipe interior 3Aa from the side of the upper end portion 3Ac of the glass pipe 3A, and is further inserted up to the inside of the lower end portion 3Ad along the inner wall face of the glass pipe 3A. Then, in an identical manner to the first holding member 6A according to the first embodiment, the first holding member 6B is arrested and supported by the conical portion 3Ae, with the conical apex portion of the first holding member 6B entering the inside of the lower end cylindrical portion 3Af and getting engaged with the inner wall face of the conical portion 3Ae. As a result, the first holding member 6B is placed in the pipe interior 3Aa without falling out from the lower end portion 3Ad of the glass pipe 3A.

Subsequently, as illustrated in a state S22 illustrated in FIG. 17, the core rods 4A-1 to 4A-4 are sequentially inserted in the pipe interior 3Aa from the side of the upper end portion 3Ac of the glass pipe 3A. At that time, the lower end portion 4d of the core rod 4A-1 is engaged with one of the engaging holes 6Ba formed on the first holding member 6B. In an identical manner, the lower end portion of each of the core rods 4A-2 to 4A-4 is engaged with one of the remaining engaging holes 6Ba. As a result, the core rods 4A-1 to 4A-4 get placed in the pipe interior 3Aa of the glass pipe 3A in such a way that the core rods 4A-1 to 4A-4 are supported by the first holding member 6B.

In the particle filling process performed at Step S103 according to the third embodiment, as illustrated in a state S23 in FIG. 17, the glass particles 8 are inserted in plurality in the pipe interior 3Aa from the side of the upper end portion 3Ac of the glass pipe 3A. As a result, in the area in the pipe interior 3Aa spanning from the top face of the first holding member 6B in the pipe interior 3Aa up to the portion close to the upper end portions of the core rods 4A-1 to 4A-4, the gap between the inner wall face of the glass pipe 3A and the core rods 4A-1 to 4A-4 is filled with the glass particles 8. The glass particles 8 that are filled in the particle filling process are made of silica glass having the average particle diameter set to be within the range from equal to or greater than 50 μm to equal to or smaller than 500 μm (for example, 200 μm).

In the rod holding process performed at Step S104 according to the third embodiment, as illustrated in a state S24 in FIG. 17, with the engaging holes 7Ba facing downward (toward the first holding member 6B of the pipe interior 3Aa), the second holding member 7B is inserted in the pipe interior 3Aa from the side of the upper end portion 3Ac of the glass pipe 3A. Then, the second holding member 7B traps the filled glass particles 8 in the pipe interior 3Aa and causes engagement of the engaging holes 7Ba with the upper end portions of the core rods 4A-1 to 4A-4 (as an example, the upper end portion 4c of the core rod 4A-1). As a result, the core rods 4A-1 to 4A-4 and the filled glass particles 8 are placed in the area enclosed by the inner wall face of the glass pipe 3A, the first holding member 6B, and the second holding member 7B. At the same time, the core rods 4A-1 to 4A-4 are held in a sandwiched manner in between the second holding member 7B and the first holding member 6B. Hence, the relative positions of the core rods 4A-1 to 4A-4 with respect to the glass pipe 3A get fixed due to the first holding member 6B and the second holding member 7B.

Meanwhile, the bulk density of the filling portion for the glass particles 8 is comparable with (is within the predetermined range of) the bulk density of the first holding member 6B and the second holding member 7B and, for example, is equal to 1.25 g/cm$^3$. Moreover, it is desirable that the glass particles 8 are made of the same type of glass powder as the glass powder used in the first holding member 6B and the second holding member 7B (for example, pure silica glass).

Figure 18:
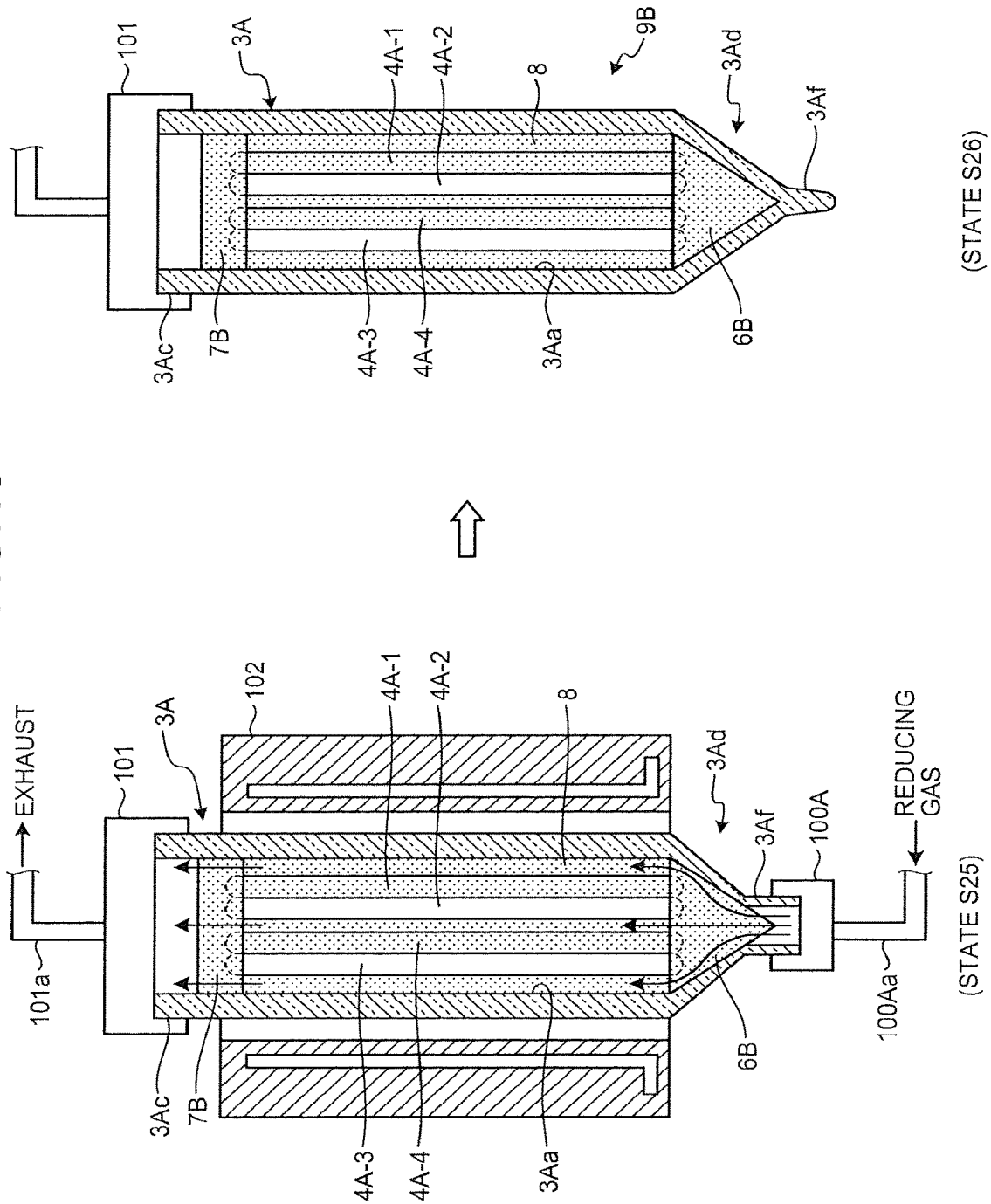
FIG. 18 is a schematic diagram for explaining the dehydroxylation process and the sealing process performed according to the third embodiment.

FIG. 18 is a schematic diagram for explaining the dehydroxylation process and the sealing process performed according to the third embodiment. In the dehydroxylation process performed at Step S105 according to the third embodiment, as illustrated in a state S25 in FIG. 18, in an identical manner to the second embodiment, firstly, the lids 101 and 100A are put on the upper end portion 3Ac and the lower end cylindrical portion 3Af, respectively, of the glass pipe 3A; and the pipe interior 3Aa is made airproof. Then, a reducing gas is supplied to the pipe interior 3Aa from the gas introduction pipe 100Aa. The reducing gas passes from the lower end portion 3Ad of the glass pipe 3A through the holes formed in the first holding member 6B, and enters the filling portion for the glass particles 8 in the pipe interior 3Aa. Then, while coming in contact with each glass particle 8 in the pipe interior 3Aa, the reducing gas passes through the gaps among the glass particles 8 in the filling portion and flows toward the upper end portion 3Ac of the glass pipe 3A. Then, the reducing gas flows to the upper end portion 3Ac of the glass pipe 3A through the holes formed in the second holding member 7B, and is discharged from the gas exhaust pipe 101a in an identical manner to the second embodiment.

Simultaneous to the circulation of the reducing gas, the heating furnace 102 heats the glass pipe 3A from the outer periphery of the glass pipe 3A in an identical manner to the second embodiment. As a result, the filled glass particles 8 are subjected to dehydroxylation in an identical manner to the second embodiment.

In the sealing process performed at Step S106 according to the third embodiment, as illustrated in a state S26 in FIG. 18, one end portion of the post-dehydroxylation glass pipe 3A (in the third embodiment, the lower end cylindrical portion 3Af of the lower end portion 3Ad) is heat-melted and subjected to diameter reduction. As a result, that end portion of the glass pipe 3A is sealed, and an intermediate object 9B is manufactured. The intermediate object 9B is a structure in which the pipe interior 3Aa includes the core rods 4A-1 to 4A-4, the first holding member 6B, the second holding member 7B, and the post-dehydroxylation filled glass particles 8; and in which one end of the glass pipe 3A is sealed. In the intermediate object 9B, the lid 101 is appropriately removed from the other end of the glass pipe 3A (in the third embodiment, the upper end portion 3Ac), and is used in the processes performed after the sealing process.

Figure 19:
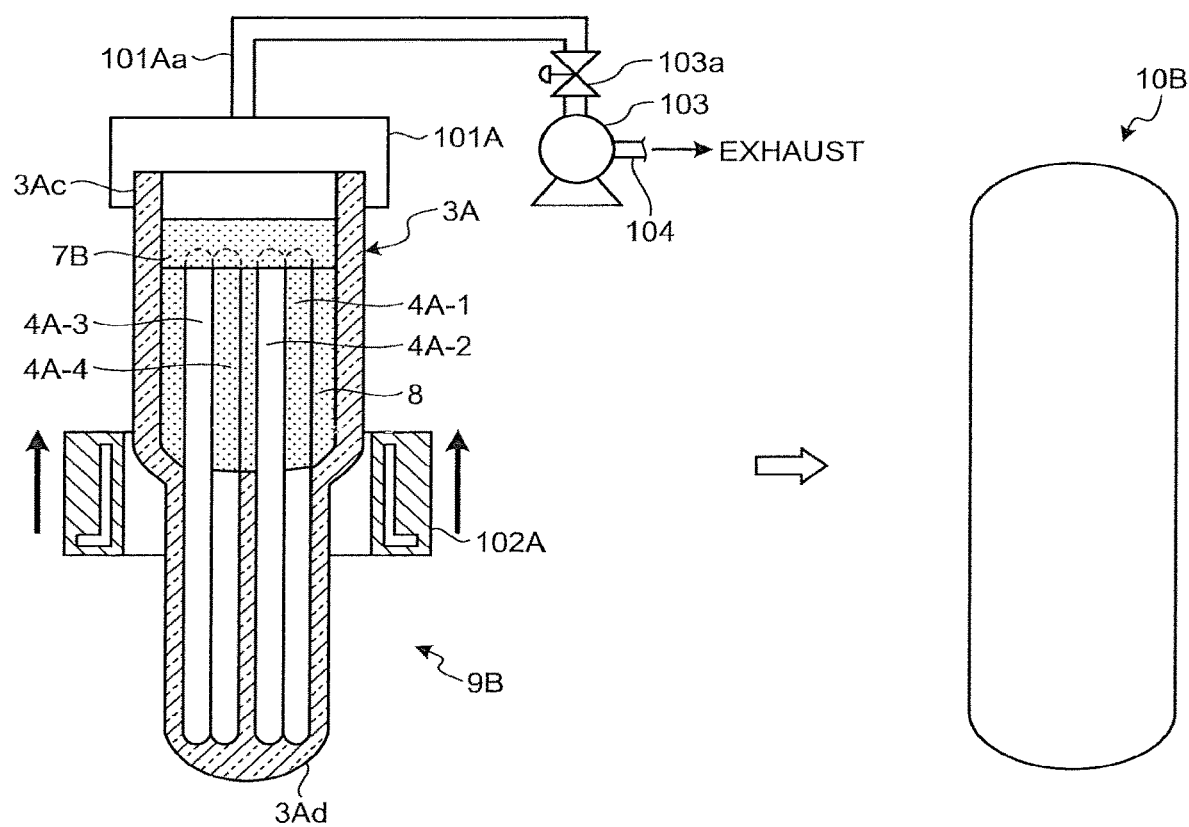
FIG. 19 is a schematic diagram for explaining the sintering process performed according to the third embodiment.

FIG. 19 is a schematic diagram for explaining the sintering process performed according to the third embodiment. In the sintering process performed at Step S108 according to the third embodiment, as illustrated in a state S27 in FIG. 19, firstly, in an identical manner to the second embodiment, the lid 101A is put on the upper end portion 3Ac of the glass pipe 3A in the intermediate object 9B, and the inside of the intermediate object 9B is made airproof. Moreover, the intermediate object 9B is set in the heating furnace 102A. Then, the exhaust valve 103a is opened and, in that state, the internal gas of the intermediate object 9B is sucked using the vacuum pump 103 through the holes formed in the second holding member 7B from the side of the upper end portion 3Ac of the glass pipe 3A that is connected to the gas exhaust pipe 101Aa; and the sucked internal gas is discharged from the gas exhaust pipe 104 in an identical manner to the second embodiment. As a result, the internal atmosphere of the glass pipe 3A in the intermediate object 9B is depressurized to a pressure equal to or smaller than a predetermined pressure in an identical manner to the second embodiment.

In parallel to the operation of depressurizing the internal atmosphere, Lie heating furnace 102A sequentially heats the intermediate object 9B from the lower end portion 3Ad up to the upper end portion 3Ac in an identical manner to the second embodiment. As a result, the first holding member 6B in the lower end portion 3Ad (see FIG. 18) and the second holding member 7B in the upper end portion 3Ac are consolidated and become transparent. Meanwhile, the glass pipe 3A melts and undergoes dimension reduction in an identical manner to the first and second embodiments. The filled glass particles 8 are consolidated and become transparent in an identical manner to the first and second embodiments. As a result, an optical fiber preform 10B is manufactured from the intermediate object 9B. The optical fiber preform 10B is a transparent preform that includes: the portion in which the glass pipe 3A melted and underwent diameter reduction; the portion in which the first holding member 6B and the second holding member 7B became transparent; the portion in which the filled glass particles 8 became transparent; and a plurality of core rods (in the third embodiment, four core rods 4A-1 to 4A-4) integrated with the other portions.

Regarding the wiredrawing process performed at Step S110 according to the third embodiment, except for the fact that the optical fiber preform 10B according to the third embodiment is used in place of the optical fiber preform 10A according to the second embodiment, the wiredrawing process is performed in an identical manner to the second embodiment. As a result, the optical fiber 11A having the configuration illustrated in FIG. 15 is manufactured. In this way, the optical fiber 11A is obtained (Step S112), and it marks the end of the processes.

On the other hand, regarding the wiredrawing process performed at Step S111 according to the third embodiment, except for the fact that the intermediate object 9B according to the third embodiment is used in place of the intermediate object 9A according to the second embodiment (see FIG. 14), the wiredrawing process is performed in an identical manner to the second embodiment. As a result, the optical fiber 11A having the configuration illustrated in FIG. 15 is manufactured from the intermediate object 9B. In this way, the optical fiber 11A is obtained (Step S113), and it marks the end of the processes. Meanwhile, if the target according to the third embodiment is to manufacture an optical fiber preform, then the optical fiber preform 10B (see FIG. 19) manufactured as a result of performing the sintering process is treated as the target. In this way, the optical fiber preform 10B is obtained as the target (Step S114), and it marks the end of the processes.

Experiment Related to Average Particle Diameter of Glass Particles

Given below is the explanation about an experiment that was performed in regard to the average particle diameter of the glass particles 8 filled in the pipe interior 3Aa of the glass pipe 3A in the optical fiber manufacturing method according to the third embodiment (hereinafter, called an average particle diameter Db). In the experiment, in the optical fiber manufacturing method according to the third embodiment, the average particle diameter Db of the glass particles 8 was varied in various ways and accordingly the particle filling process at Step S103 was performed; and samples #10 to #14 of the optical fiber 11A were manufactured on the basis of the average particle diameters Db of the glass particles 8.

The sample #10 is about the optical fiber 11A manufactured using the glass particles 8 having the average particle diameter Db of 30 μm. The sample #11 is about the optical fiber 11A manufactured using the glass particles 8 having the average particle diameter Db of 50 μm. The sample #12 is about the optical fiber 11A manufactured using the glass particles 8 having the average particle diameter Db of 90 μm. The sample #13 is about the optical fiber 11A manufactured using the glass particles 8 having the average particle diameter Db of 200 μm. The sample #14 is about the optical fiber 11A manufactured using the glass particles 8 having the average particle diameter Db of 500 μm.

Subsequently, regarding each of the samples #10 to #14 in the experiment, the core intervals among the core portions 1A-1 to 1A-4 (see FIG. 15) were measured. A core interval represents the interval between two neighboring core portions from among the core portions 1A-1 to 1A-4. More particularly, the center-to-center distance between the core portion 1A-1 and the core portion 1A-2; the center-to-center distance between the core portion 1A-2 and the core portion 1A-3; the center-to-center distance between the core portion 1A-3 and the core portion 1A-4; and the center-to-center distance between the core portion 1A-4 and the core portion 1A-1 represent the core intervals in the experiment. Then, regarding each of the samples #10 to #14 in the experiment, the maximum core interval (measured value) and the minimum core interval (measured value) was extracted from among the measured core intervals of the core portions 1A-1 to 1A-4, and the inter-core difference was obtained. In the experiment, the inter-core difference was calculated by dividing the minimum core interval (measured value) from the maximum core interval (measured value). In Table 2 is illustrated the relationship between the average particle diameters Db of the glass particles 8, the maximum core intervals, the minimum core intervals, and the inter-core differences.

TABLE 2

| | Average particle diameter Db [μm] | Core interval (Maximum) [μm] | Core interval (Minimum) [μm] | Inter-core difference [μm] |
| --- | --- | --- | --- | --- |
| sample #10 | 30 | 42.1 | 38.5 | 3.6 |
| sample #11 | 50 | 40.9 | 39.2 | 1.7 |
| sample #12 | 90 | 40.8 | 39 | 1.8 |
| sample #13 | 200 | 40.5 | 39.2 | 1.3 |
| sample #14 | 500 | 40.8 | 39 | 1.8 |

As is clear from Table 2, as a result of comparing the sample #10 with the samples #11 to #14, it was confirmed that, when the average particle diameter Db is equal to or greater than 50 μm and equal to or smaller than 500 μm, the inter-core difference remains stable at a small value; and, when the average particle diameter Db falls below 50 μm, the inter-core difference increases steeply (for example, increases by double or more). Herein, "the inter-core difference remains stable at a small value" implies that the relative position shift among the core portions 1A-1 to 1A-4 in the optical fiber 11A illustrated in FIG. 15 is sufficiently held down. Thus, from the perspective of enhancing the positional accuracy of the core portions in a multicore fiber, it is desirable that the filled glass particles 8 have the average particle diameter Db equal to or greater than 50 μm and equal to smaller than 500 μm.

In the optical fiber manufacturing method according to the third embodiment, in the pipe interior 3Aa of the glass pipe 3A, a plurality of core rods (for example, four core rods 4A-1 to 4A-4) is held in a sandwiched manner in between the first holding member 6B and the second holding member 7B from both ends in the longitudinal direction of the core rods. Moreover, the glass particles 8 that are filled in the gaps formed between the core rods and the inner face wall of the glass pipe 3A are set to have the average particle diameter Db equal to or greater than 50 μm and equal to smaller than 500 μm. Hence, in addition to achieving the effects achieved in the second embodiment, the position shift among the core portions, which are made of the core forming portions of the core rods, can be sufficiently held down; and a multicore fiber having the core portions at a plurality of target positions in an accurate manner can be manufactured with ease and with a high yield ratio.

Fourth Embodiment

Figure 20:
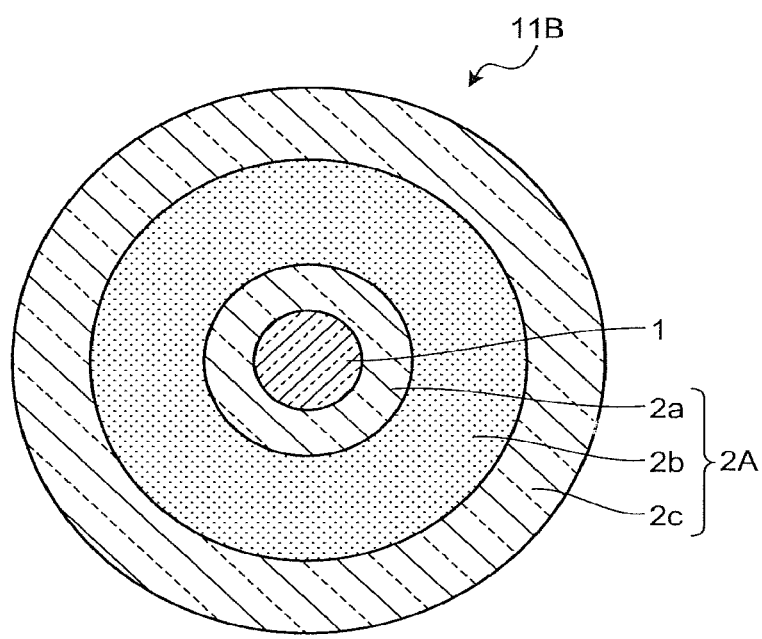
FIG. 20 is a schematic cross-sectional view illustrating an exemplary configuration of an optical fiber manufactured by an optical fiber manufacturing method according to a fourth embodiment of the present disclosure.

Given below is the explanation of a fourth embodiment of the present disclosure. FIG. 20 is a schematic cross-sectional view illustrating an exemplary configuration of an optical fiber manufactured by an optical fiber manufacturing method according to the fourth embodiment of the present disclosure. An optical fiber 11B according to the fourth embodiment is made of silica based glass and, as illustrated in FIG. 20, includes the core portion 1 and a cladding portion 2A that is formed on the outer periphery of the core portion 1. Moreover, although not illustrated in FIG. 20, there is a coating formed on the outer periphery of the cladding portion 2A. The coating is same as the coating usually used in optical fibers.

The core portion 1 is made of silica glass added with $GeO_2$ as described earlier. The cladding portion 2A is made of pure silica glass not added with any dopant for refractive index adjustment and, as illustrated in FIG. 20, includes a first-type cladding layer 2a, a second-type cladding layer 2b, and a third-type cladding layer 2c.

As illustrated in FIG. 20, the first-type cladding layer 2a represents a first-type cladding area formed to be adjacent to the core portion 1 across the outer periphery of the core portion 1. The second-type cladding layer 2b represents a second-type cladding area formed to be adjacent to the first-type cladding layer 2a across the outer periphery of the first-type cladding layer 2a. The third-type cladding layer 2c represents a third-type cladding area formed to be adjacent to the second-type cladding layer 2b across the outer periphery of the second-type cladding layer 2b. Moreover, in the fourth embodiment, the second-type cladding layer 2b includes a plurality of (a number of) independent bubbles. The independent bubbles are formed independent of each other at distant positions from the core portion 1, and are minute irregular bubbles. As a result of including a plurality of independent bubbles, the second-type cladding layer 2b becomes an area having relatively low refractive index in the cladding portion 2A, that is, becomes an independent bubble area.

Given below is the explanation of the optical fiber manufacturing method according to the fourth embodiment of the present disclosure. In the optical fiber manufacturing method according to the fourth embodiment, in the sintering process performed at Step S108 or the wiredrawing process performed at Step S111 as illustrated in FIG. 2, a plurality of independent bubbles is formed in the gaps among the filled glass particles 8. Apart from that, the remaining configuration is identical to the second embodiment, and the same constituent elements are referred to by the same reference numerals and their detailed explanation is not repeated.

In the optical fiber manufacturing method according to the fourth embodiment, the processes performed at Step S101 to Step S106 illustrated in FIG. 2 are performed in an identical manner to the second embodiment, and consequently the intermediate object 9A (see FIG. 13) is manufactured. Meanwhile, in the fourth embodiment, for example, the core rod 4 (see FIG. 11) is set to have the outer diameter of the cladding forming portion 4b to be equal to 2.5 times of the core forming portion 4a, and is extended to have the outer diameter of 20 mm. In the case of manufacturing an optical fiber from the intermediate object 9A via an optical fiber preform; in the fourth embodiment, the optical fiber manufacturing process includes the sintering process performed at Step S108 and the wiredrawing process performed at Step S110.

Figure 21:
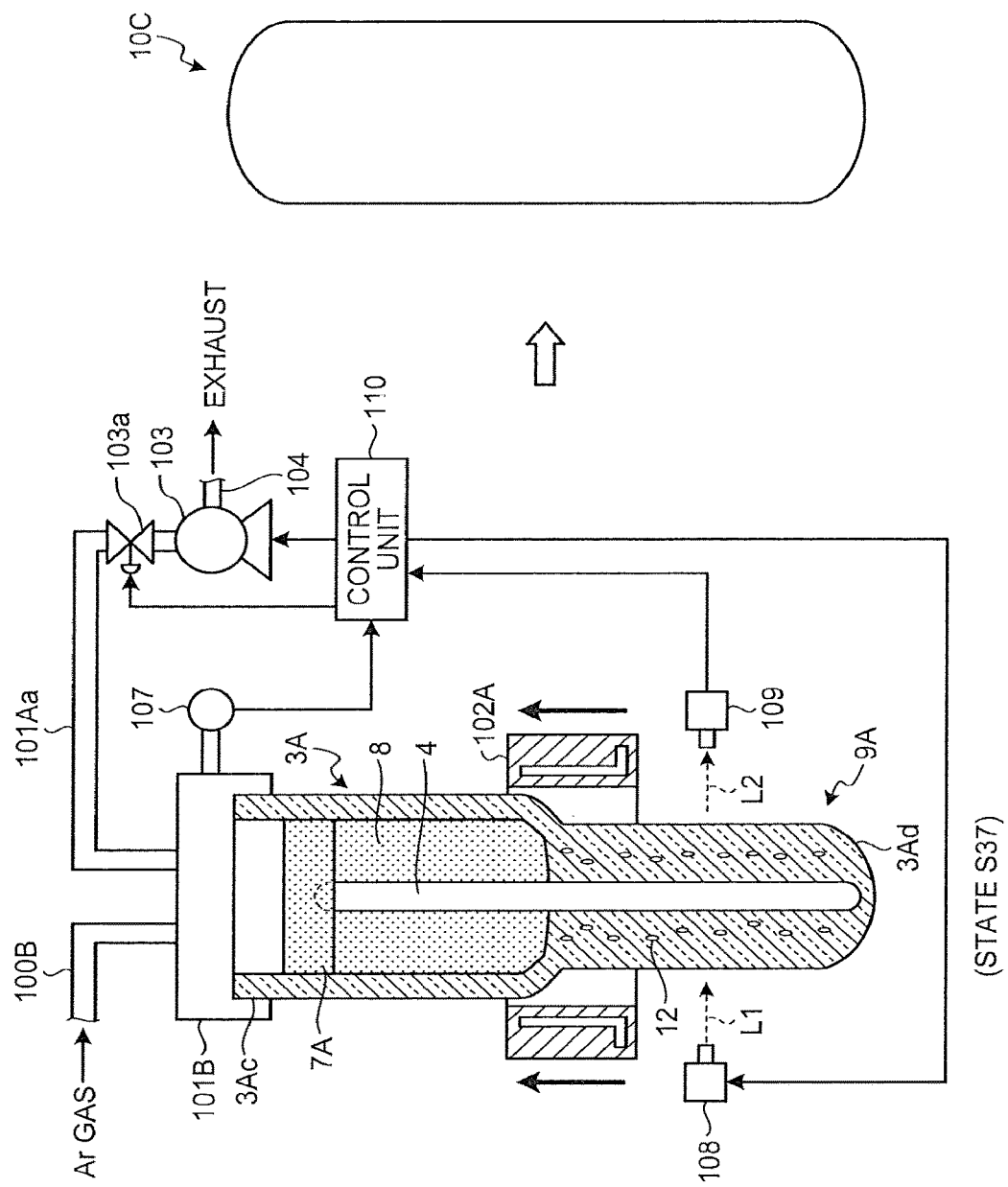
FIG. 21 is a schematic diagram for explaining the sintering process performed according to the fourth embodiment.

FIG. 21 is a schematic diagram for explaining the sintering process performed according to the fourth embodiment. In the sintering process performed at Step S108 according to the fourth embodiment, the intermediate object 9A is heated while pressurizing the internal atmosphere of the glass pipe 3A through the holes formed in the second holding member 7A; the first holding member 6A and the second holding member 7A are consolidated; and a plurality of independent bubbles 12 is formed among the glass particles 8 while sintering the filled glass particles 8. As a result, an optical fiber preform 10C is manufactured in which the independent bubbles 12 are included in the sintered area of the glass particles 8.

More specifically, as illustrated in a state S37 in FIG. 21, firstly, a lid 101B is put on the upper end portion 3Ac of the glass pipe 3A in the intermediate object 9A, and the inside of the intermediate object 9A is made airproof. To the lid 101B, gas introduction pipes 100B and 101Aa are connected that lead to the inside of the airproof intermediate object 9A. The gas introduction pipe 100B is a pipe for introducing argon (Ar) gas into the airproof intermediate object 9A. To the gas introduction pipe 101Aa are sequentially connected the exhaust valve 103a, the vacuum pump 103, and the gas exhaust pipe 104 in an identical manner to the second embodiment. Moreover, in the lid 101B, a manometer 107 is installed for measuring the pressure of the inside of the airproof intermediate object 9A (particularly, in the gaps among the filled glass particles 8). The manometer 107 sends measurement value data of the measured pressure to a control unit 110. Meanwhile, the intermediate object 9A is set in the heating furnace 102A.

Moreover, a light emitting device 108 and a measuring device 109 are disposed below and near the heating furnace 102A. The light emitting device 108 emits a light L1 such as laser light to the intermediate object 9A that has been heated by the heating furnace 102A. The measuring device 109 measures the power of the transmission light L2 that has passed through the post-heating intermediate object 9A from among the light L1 emitted from the light emitting device 108. Then, the measuring device 109 sends measurement value data of the measured power of the transmission L2 to the control unit 110. The light emitting device 108 and the measuring device 109 are configured to be movable along with the heating furnace 102A (for example, to be movable upward along the longitudinal direction of the intermediate object 9A) while maintaining a constant distance from the heating furnace 102A. Based on the measurement value data of pressure as obtained from the manometer 107, the control unit 110 can control the exhaust valve 103a and the vacuum pump 103 and accordingly can control the pressure inside the intermediate object 9A. Moreover, while controlling the emission of the light L1 from the light emitting device 108, the control unit 110 can control the exhaust valve 103a and the vacuum pump 103 based on the measurement value data obtained from the measuring device 109, and accordingly can adjust the pressure inside the intermediate object 9A.

After the inside of the intermediate object 9A is made airproof as described above, the argon (Ar) gas coming from the gas introduction pipe 100B is introduced to the inside of the intermediate object 9A, such as the in gaps among the filled glass particles 8, through the holes of the second holding member 7A from the side of the upper end portion 3Ac of the glass pipe 3A. Moreover, the exhaust valve 103a is opened and, in that state, the internal gas of the intermediate object 9A is sucked using the vacuum pump 103 through the holes formed in the second holding member 7A from the side of the upper end portion 3Ac of the glass pipe 3A; and the sucked internal gas is discharged from the gas exhaust pipe 104. As a result, the internal atmosphere of the glass pipe 3A in the intermediate object 9A is converted into argon (Ar) gas and is pressurized. At that time, the control unit 110 controls the exhaust valve 103a and the vacuum pump 103 based on the measurement value data obtained from the manometer 107, and accordingly controls the pressure inside the pressurized intermediate object 9A (control pressure) within the range from equal to or greater than the lower limit of the pressure at which the independent bubbles 12 can be formed to equal to or smaller than the upper limit of the pressure at which deformation and rupture of the glass pipe at the time of heating can be avoided.

In parallel to the control operation performed for controlling the internal atmosphere, in an identical manner to the second embodiment, the heating furnace 102A heats the intermediate object 9A from the lower end portion 3Ad to the upper end portion 3Ac in a sequential manner along the outer periphery of the intermediate object 9A while moving from the lower end portion 3Ad to the upper end portion 3Ac along the outer periphery of the glass pipe 3A. Following the heating furnace 102A, the light emitting device 108 emits the light L1 onto the post-heating intermediate object 9A; and the measuring device 109 measures the power of the transmission light L2 that has passed through the post-heating intermediate object 9A, and sends the measurement value data of the measured power of the transmission light L2 to the control unit 110. As a result of the heating operation, the glass pipe 3A melts and undergoes diameter reduction from the lower end portion 3Ad to the upper end portion 3Ac in a sequential manner; and the first holding member 6A in the lower end portion 3Ad (see FIG. 13) becomes consolidated and transparent as well as the second holding member 7A in the upper end portion 3Ac becomes consolidated and transparent. Moreover, while the filled glass particles 8 are sequentially sintered from the lower end portion 3Ad toward the upper end portion 3Ac, the independent bubbles 12 are formed in the gaps among the filled glass particles 8.

The power of the transmission light L2 indicates the characteristics of the independent bubbles 12 formed inside the sintered area of the glass particles 8 that are sintered as a result of the heating operation. In the heating operation, the control unit 110 controls the exhaust valve 103a and the vacuum pump 103 based on the measurement value data obtained from the measuring device 109; and, while estimating the characteristics such as the count and the size of the independent bubbles 12, accordingly adjusts the control pressure inside the intermediate object 9A in such a way that the independent bubbles 12 having the desired characteristics are formed. As a result of heating the intermediate object 9A while adjusting the control pressure, a plurality of independent bubbles 12 get formed inside the sintered area of the glass particles 8 and at distant positions from the core rod 4 in such a dispersed manner that the bubble density in the longitudinal direction of the core rod 4 is stable across the outer periphery of the core rod 4.

As a result of performing the sintering process, the optical fiber preform 10C is manufactured from the intermediate object 9A. The optical fiber preform 10C is a preform that includes: the portion in which the glass pipe 3A melted and underwent diameter reduction; the portion in which the first holding member 6A and the second holding member 7A became transparent; the sintered area of the glass particles 8 in which a plurality of independent bubbles 12 is formed; and the core rod 4 integrated with the other portions. Meanwhile, the gas to be subjected to pressure control is not limited to the argon (Ar) gas, and any other gas enabling formation of bubbles inside the glass can be used.

Figure 22:
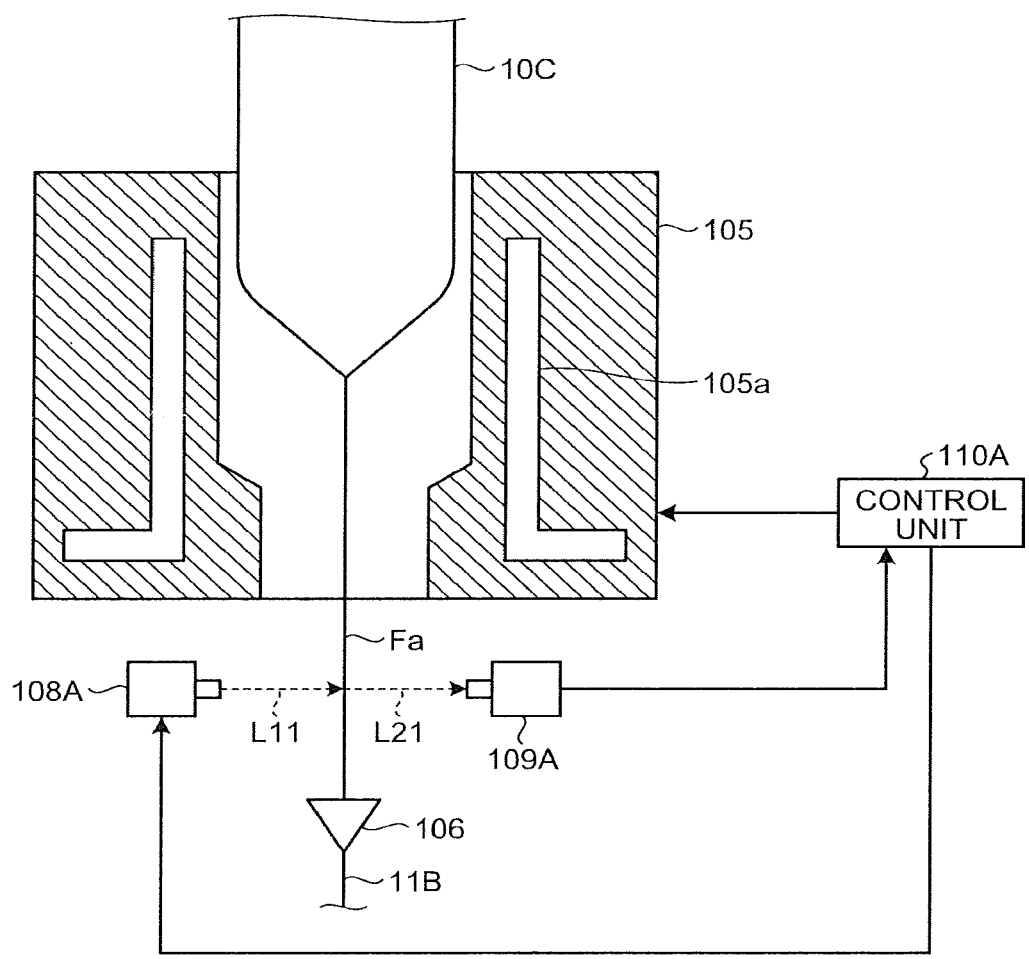
FIG. 22 is a schematic diagram for explaining the wire-drawing process performed using an optical fiber preform manufactured according to the fourth embodiment.

FIG. 22 is a schematic diagram for explaining the wiredrawing process performed using the optical fiber preform manufactured according to the fourth embodiment. In the wiredrawing process performed at Step S110 according to the fourth embodiment, the optical fiber preform 10C (see FIG. 21), which is manufactured as a result of performing the sintering process, is heat-melted and an optical fiber is wiredrawn.

More specifically, as illustrated in FIG. 22, firstly, the optical fiber preform 10C is set in the optical fiber wiredrawing furnace 105, Moreover, in the fourth embodiment, a light emitting device 108A and a measuring device 109A are disposed below the optical fiber wiredrawing furnace 105 and above the die 106. Then, under the control performed by a control unit 110A regarding wiredrawing conditions, the optical fiber wiredrawing furnace 105 heats the lower end portion of the optical fiber preform 10C using the heater 105a. As a result, the optical fiber wiredrawing furnace 105 melts the lower end portion of the optical fiber preform 10C and wiredraws an optical fiber Fa. At that time, the light emitting device 108A emits a light L11 such as laser light onto the optical fiber Fa that is wiredrawn from the optical fiber preform 10C. The measuring device 109A measures the power of a transmission light L21 that has passed through the wiredrawn optical fiber Fa from among the light L11 emitted from the light emitting device 108A. The measuring device 109A sends the measurement value data of the measured power of the transmission light L21 to the control unit 110A. Then, while controlling the emission of the light L11 from the light emitting device 108A, the control unit 110A controls the wiredrawing conditions in the optical fiber wiredrawing furnace 105 based on the measurement value data obtained from the measuring device 109A. Examples of the wiredrawing conditions include the wiredrawing speed and the heating temperature.

The optical fiber Fa that is wiredrawn using the optical fiber wiredrawing furnace 105 is in the bare wire state without having any coating on its outer periphery, and is thus subjected to a coating operation using the die 106. As a result, the optical fiber 11B having the configuration illustrated in FIG. 20 is manufactured. In this way, the optical fiber 11B is obtained (Step S112), and it marks the end of the processes. As a result of performing the wiredrawing process, the sintered area of the glass particles 8 in the optical fiber preform 10C serves as an independent bubble area (i.e., the second-type cladding layer 2b) that represents a part of the cladding portion 2A of the optical fiber 11B and that is formed with a plurality of independent bubbles 12 at distant positions from the core portion 1. Moreover, of the optical fiber preform 10C, the core forming portion 4a of the core rod 4 serves as the core portion 1; the cladding forming portion 4b of the core rod 4 serves as the first-type cladding layer 2a; the portion in which the glass pipe 3A melts and undergoes diameter reduction serves as the third-type cladding layer 2c; and the portion in which the first holding member 6A and the second holding member 7A become transparent serves as a part of the cladding portion 2A.

Meanwhile, in the fourth embodiment, in the case of manufacturing an optical fiber from the intermediate object 9A without involving an optical fiber preform, the optical fiber manufacturing process includes the wiredrawing process performed at Step S111 (see FIG. 2). Then, the optical fiber 11B is obtained by performing the wiredrawing process (Step S113), and it marks the end of the processes. Meanwhile, if the target according to the fourth embodiment is to manufacture an optical fiber preform, then the optical fiber preform 10C (see FIG. 21) manufactured as a result of performing the sintering process is treated as the target. In this way, the optical fiber preform 100 is obtained as the target (Step S114), and it marks the end of the processes.

In the wiredrawing process performed at Step S111 according to the fourth embodiment, firstly, in the optical fiber wiredrawing furnace 105, the intermediate object 9A is set in place of the optical fiber preform 10C. Then, in an identical manner to the sintering process illustrated in FIG. 21, the internal atmosphere of the glass pipe 3A is pressurized through the holes formed in the second holding member 7A while adjusting the control pressure. In parallel to that, in an identical manner to the wiredrawing process illustrated in FIG. 22, the intermediate object 9A is heated using the optical fiber wiredrawing furnace 105 while controlling the wiredrawing conditions. As a result, in the intermediate object 9A, the glass pipe 3A and the core rod 4 melt, and the first holding member 6A and the second holding member 7A become consolidated; and, with the bubbles formed among the glass particles 8 while sintering the filled glass particles 8 representing the independent bubbles 12, the optical fiber Fa is wiredrawn. Then, the optical fiber Fa is subjected to a coating operation using the die 106. As a result, the optical fiber 11B having the configuration illustrated in FIG. 20 is manufactured from the intermediate object 9A.

As a result of performing the wiredrawing process, the sintering area of the glass particles 8 in the intermediate object 9A serves as the independent bubble area (i.e., the second-type cladding layer 2b) that represents a part of the cladding portion 2A of the optical fiber 11B and that is formed with a plurality of Independent bubbles 12 at distant positions from the core portion 1. Moreover, of the intermediate object 9A, the core forming portion 4a of the core rod 4 serves as the core portion 1; the cladding forming portion 4b of the core rod 4 serves as the first-type cladding layer 2a; the portion in which the glass pipe 3A melts and undergoes diameter reduction becomes the third-type cladding layer 2c; and the portion in which the first holding member 6A and the second holding member 7A become transparent serves as a part of the cladding portion 2A.

In the optical fiber manufacturing method according to the fourth embodiment, the intermediate object 9A is manufactured in an identical manner to the second embodiment; the intermediate object 9A is heated while pressurizing the internal atmosphere of the glass pipe 3A through the holes formed in the second holding member 7A in the intermediate object 9A; the independent bubbles formed among the glass particles 8 while sintering the filled glass particles 8 in the intermediate object 9A are treated as the independent bubbles 12; and a plurality of independent bubbles 12 is formed inside the sintered area of the glass particles 8 and at distant positions from the core rod 4 in such a dispersed manner that the bubble density in the longitudinal direction of the core rod 4 is stable across the outer periphery of the core rod 4. For that reason, in addition to achieving the effects achieved in the second embodiment, the sintered area of the glass particles 8 including the independent bubbles 12 can be treated as the independent bubble area having a relatively lower refractive index in the cladding portion 2A, and the optical fiber 11B having the independent bubble area (the second-type cladding layer 2b) at a distant position from the core portion 1 across the outer periphery of the core portion 1 can be manufactured with ease. Moreover, the characteristics of the independent bubbles 12 are estimated based on the power of the transmission light that has passed through the sintered area of the glass particles 8 or through the independent bubble area of the optical fiber Fa; and, based on the estimation result, the optical fiber preform 10C is manufactured or the optical fiber Fa is wiredrawn while adjusting the control pressure of the internal atmosphere of the glass pipe 3A in the intermediate object 9A. Hence, it becomes possible to manufacture the optical fiber preform 100 or the optical fiber 11B that includes a plurality of independent bubbles 12 having a stable bubble density in the longitudinal direction.

Fifth Embodiment

Figure 23:
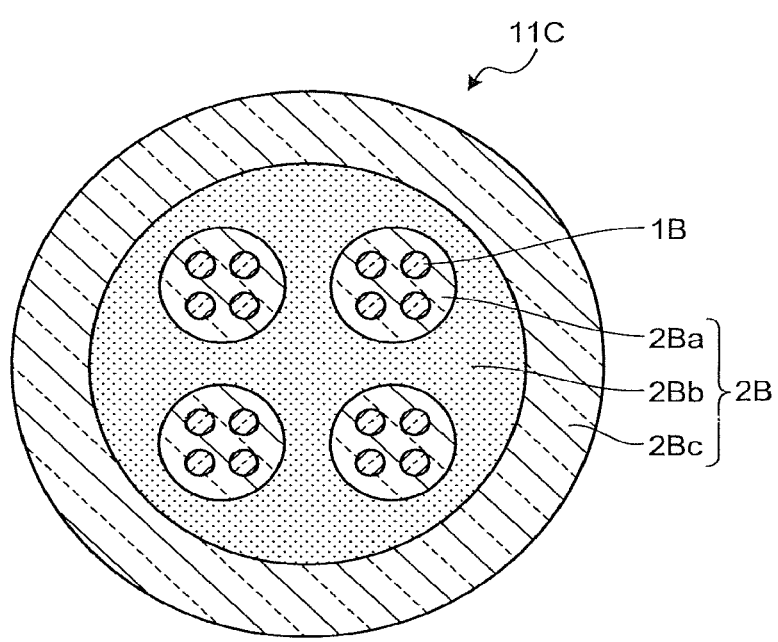
FIG. 23 is a schematic cross-sectional view illustrating an exemplary configuration of an optical fiber manufactured by an optical fiber manufacturing method according to a fifth embodiment of the present disclosure.

Given below is the explanation of a fifth embodiment. FIG. 23 is a schematic cross-sectional view illustrating an exemplary configuration of an optical fiber manufactured by an optical fiber manufacturing method according to the fifth embodiment of the present disclosure. An optical fiber 11C according to the fifth embodiment is made of silica based glass and, as illustrated in FIG. 23, includes a plurality of core portions 1B (in the fifth embodiment, a total of 16 core portions 1B arranged in a square lattice), and a cladding portion 2B that is formed on the outer periphery of the core portions 1B. Moreover, although not illustrated in FIG. 23, there is a coating formed on the outer periphery of the cladding portion 2B. The coating is same as the coating usually used in optical fibers.

The core portion 1B is made of silica glass added with $GeO_2$ that serves as a dopant for enhancing the refractive index. In the fifth embodiment, for example, as illustrated in FIG. 23, four unit core groups, in each of which four core portions 1B arranged in a square lattice are grouped together, are arranged in a square lattice. The cladding portion 2B is made of pure silica glass not added with any dopant for refractive index adjustment. As illustrated in FIG. 23, the cladding portion 2B includes a plurality of first-type cladding layers 2Ba (in the fifth embodiment, four first-type cladding layers 2Ba arranged in a square lattice), a second-type cladding layer 2Bb, and a third-type cladding layer 2Bc.

As illustrated in FIG. 23, each first-type cladding layer 2Ba is a first-type cladding area formed to be adjacent to the core portions 1B present in a unit core group across the outer periphery of the corresponding core portion 1B. In the fifth embodiment, for example, four first-type cladding layers 2Ba are arranged in a square lattice corresponding to the unit core groups of the core portions 1B. The second-type cladding layer 2Bb is a second-type cladding area formed to be adjacent to the first-type cladding layers 2Ba across the outer periphery of the first-type cladding layers 2Ba. The third-type cladding layer 2Bc is a third-type cladding layer formed to be adjacent to the second-type cladding layer 2Bb across the outer periphery of the second-type cladding layer 28b. Moreover, in the fifth embodiment, the second-type cladding layer 2Bb includes a plurality of independent bubbles in an identical manner to the second-type cladding layer 2b in the optical fiber 11B according to the fourth embodiment. As a result of including a plurality of independent bubbles, the second-type cladding layer 2Bb becomes an area having a relatively low refractive index in the cladding portion 2B, that is, becomes an independent bubble area.

Given below is the explanation of the optical fiber manufacturing method according to the fifth embodiment. In the optical fiber manufacturing method according to the fifth embodiment, in the preparation process performed at Step S101 illustrated in FIG. 2, the number of core forming portions included in each of a plurality of prepared core rods is different than in the third embodiment, and the processes after the preparation process are performed using those prepared core rods. Moreover, in the sintering process performed at Step S108 or the wiredrawing process at Step S111, a plurality of independent bubbles is formed in the gaps among the filled glass particles 8. Apart from that, the remaining configuration is identical to the third embodiment, and the same constituent elements are referred to by the same reference numerals and their detailed explanation is not repeated.

Figure 24:
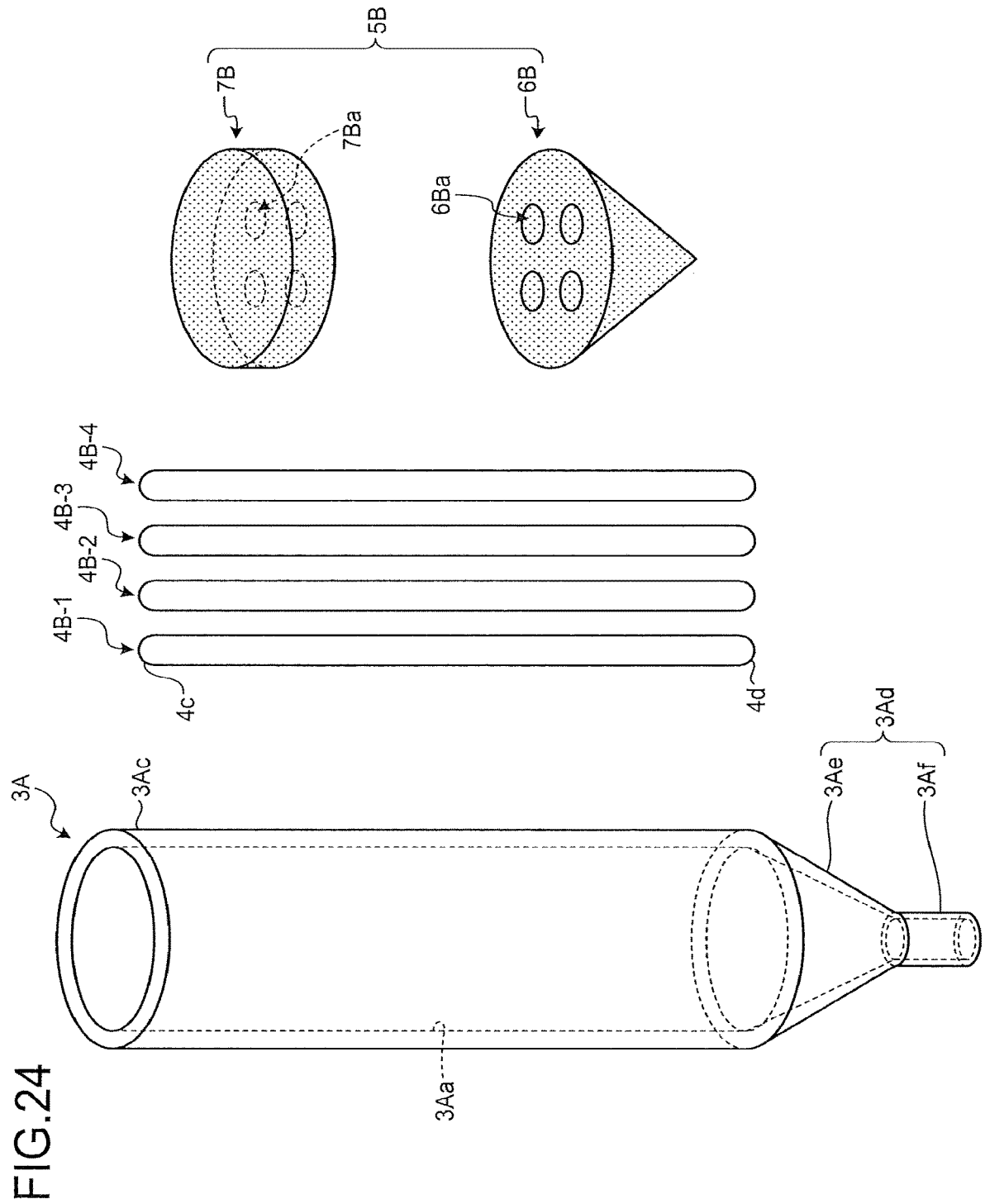
FIG. 24 is a schematic diagram for explaining the preparation process performed according to the fifth embodiment.

FIG. 24 is a schematic diagram for explaining the preparation process performed according to the fifth embodiment. In the preparation process performed at Step S101 according to the fifth embodiment, the glass pipe 3A as illustrated in FIG. 24, a plurality of (in the fifth embodiment, four) core rods 4B-1 to 4B-4, and the pair of holding members 5B are prepared.

Each of the core rods 4B-1 to 4B-4 includes a plurality of (in the fifth embodiment, four) core forming portions, and a cladding forming portion that is formed adjacent to the core forming portions along the outer periphery of the core forming portions. Each of the core rods 4B-1 to 4B-4 can be manufactured and prepared by performing processes identical to the processes performed from Step S101 to Step S106 and at Step S108 according to the third embodiment.

Figure 25:
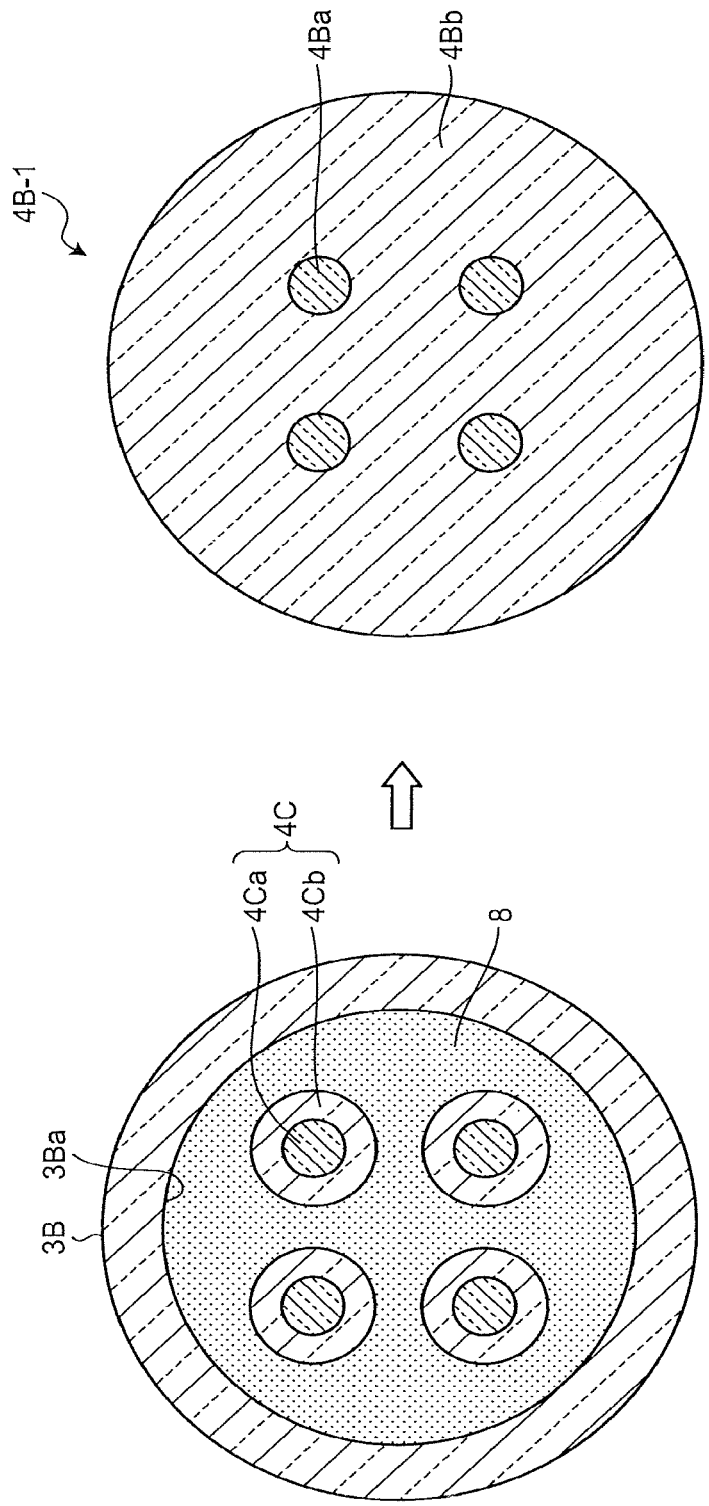
FIG. 25 is a schematic diagram for explaining a core rod manufacturing method according to the fifth embodiment.

FIG. 25 is a schematic diagram for explaining a core rod manufacturing method according to the fifth embodiment. In FIG. 25 is illustrated a transverse section of the constituent elements. In the core rod manufacturing method according to the fifth embodiment, firstly, by performing an identical process to the preparation process performed at Step S101 according to the third embodiment, a glass pipe 3B and four core rods 4C illustrated in FIG. 25 are prepared along with a first holding member (not illustrated) and a second holding member (not illustrated).

The glass pipe 3B is manufactured according to the identical method to the manufacturing method of the glass pipe 3A according to the third embodiment; and has an identical configuration to the glass pipe 3A, except for the fact that the glass pipe 3B is smaller in size than the glass pipe 3A. For example, the glass pipe 3B is a synthetic silica pipe that has the outer diameter of 40 mm, has the inner diameter of 34 mm, and has the lower end portion subjected to diameter reduction in a conical shape. Each core rod 4C includes a core forming portion 4Ca that is made of silica glass and that has $GeO_2$ added thereto, and includes a cladding forming portion 4Cb that is made of pure silica glass and that is formed to be adjacent to the core forming portion 4Ca across the outer periphery of the core forming portion 4Ca. The core rods 4C are manufactured according to the identical method to the manufacturing method of the core rod 4 (see FIG. 3). For example, each core rod 4C is set to have the diameter of the cladding forming portion 4Cb to be equal to 1.5 times of the diameter of the core forming portion 4Ca, and is extended to have the outer diameter of 15 mm.

The first holding member and the second holding member that are used in the core rod manufacturing method according to the fifth embodiment are manufactured according to the identical method to the manufacturing method of the first holding member 6B and the second holding member 7B according to the third embodiment, and have an identical configuration to the configuration of the first holding member 6B and the second holding member 7B, respectively, expect for the fact that the size is smaller than the first holding member 6B and the second holding member 7B, respectively. For example, the first holding member is a conical glass porous body having the outer diameter of 26 mm, and the second holding member is a columnar glass porous body having the outer diameter of 26 mm.

Subsequently, the glass pipe 3B, the four core rods 4C, the first holding member, and the second holding member that are prepared as a result of performing the preparation process are used in performing the rod setup process, the particle filling process, the rod holding process, the dehydroxylation process, and the sealing process in an identical manner to the Step S102 to Step S106 according to the third embodiment. As a result, as illustrated in FIG. 25, the four core rods 4C are arranged in a square lattice in a pipe interior 3Ba of the glass pipe 3B; the glass particles 8 are filled in the gaps between the core rods 4C and the inner wall face of the glass pipe 3B; and the filled glass particles 8 are subjected to dehydroxylation. Meanwhile, although not illustrated in FIG. 4, the four core rods 4C are held in a sandwiched manner in between the first holding member and the second holding member, which are prepared in the preparation process, from both ends in the longitudinal direction of the core rods 4C. Moreover, the lower end portion of the glass pipe 3B is sealed as a result of heating performed in the sealing process. Hence, a glass rod intermediate object (not illustrated) is manufactured that includes the glass pipe 3B, the four core rods 4C, the post-dehydroxylation filled glass particles 8, the first holding member, and the second holding member.

Subsequently, the glass rod intermediate object is used in performing the sintering process identical to Step S108 according to the third embodiment. As a result, in the glass rod intermediate object, the filled glass particles 8, the first holding member, and the second holding member become consolidated; and a transparent glass rod including the four core rods 4C is manufactured. Then, the glass rod is extended to have a predetermined external diameter (for example, 30 mm) and consequently the core rod 4B-1 is manufactured and prepared as illustrated in FIG. 25. At that time, the core forming portion 4Ca of each core rod 4C serves as a core forming portion 4Ba of the core rod 4B-1. The cladding forming portion 4Cb of each of the four core rods 4C, the glass particles 8 in the filled state, the glass pipe 3B, the first holding member, and the second holding member serve as a cladding forming portion 4Bb of the core rod 4B-1. Meanwhile, the remaining core rods 4B-2 to 4B-4 illustrated in FIG. 24 are manufactured and prepared according to the identical method to the manufacturing method of the core rod 4B-1.

After the glass pipe 3A, the core rods 4B-1 to 4B-4, and the pair of holding members 5B (the first holding member 6B and the second holding member 7B) are prepared as a result of performing the preparation process as illustrated in FIG. 24, those constituent elements are used in performing the processes from Step S102 to Step S111 illustrated in FIG. 2. In the fifth embodiment, the rod setup process performed at Step S102, the particle filling process performed at Step S103, the rod holding process performed at Step S104, the dehydroxylation process performed at Step S105, and the sealing process performed at Step S106 are performed in an identical manner to the third embodiment. As a result, an intermediate object 9C (see FIG. 26 (described later)) according to the fifth embodiment is manufactured. Thus, the intermediate object 9C has the configuration obtained by substituting the core rods 4B-1 to 4B-4, each of which includes a plurality of core forming portions, for the core rods 4A-1 to 4A-4 in the intermediate object 9B (see FIG. 18) according to the third embodiment.

In the case of manufacturing an optical fiber from the intermediate object 9C via an optical fiber preform; in the fifth embodiment, the optical fiber manufacturing method includes the sintering process performed at Step S108 and the wiredrawing process performed at Step S110.

Figure 26:
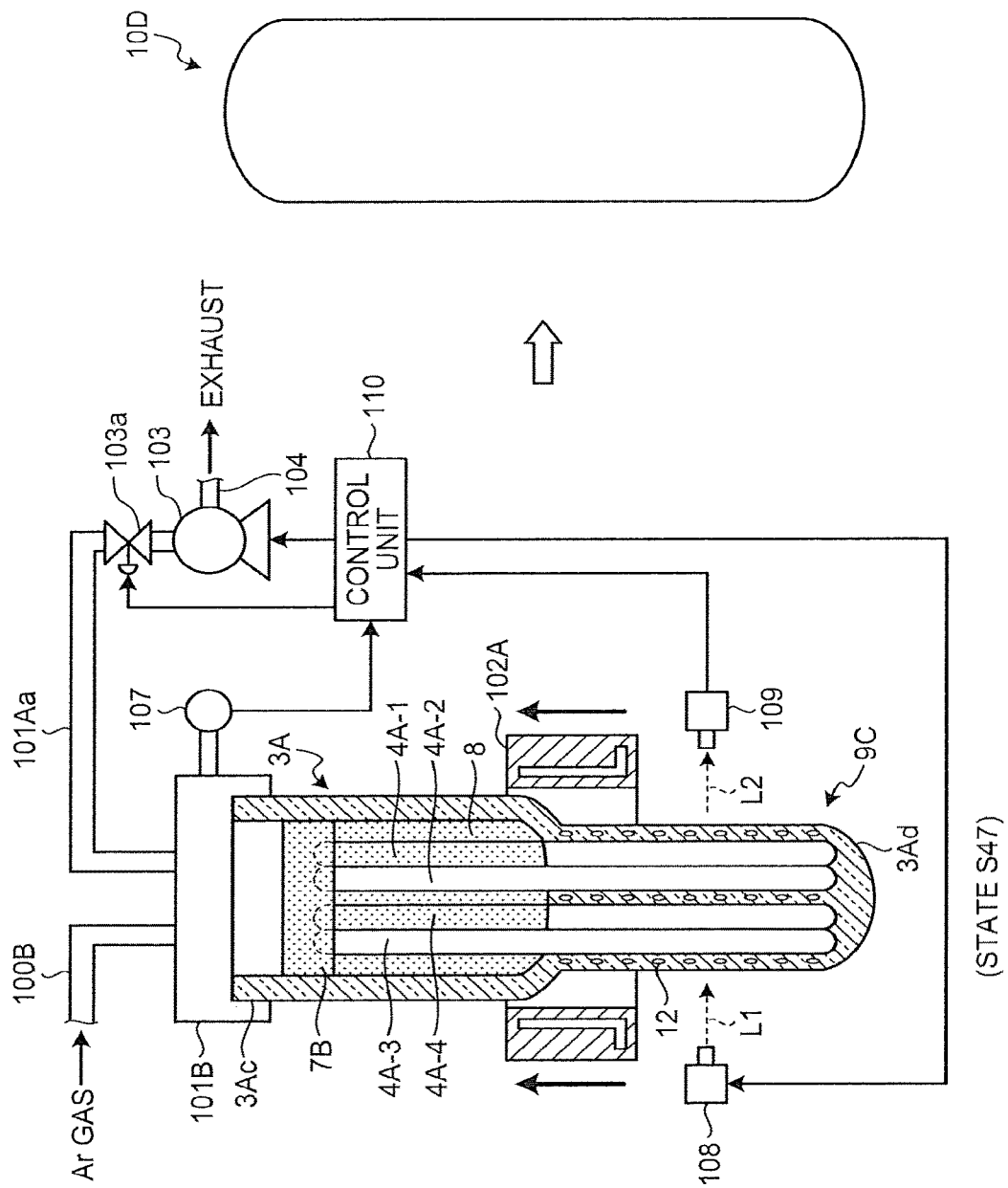
FIG. 26 is a schematic diagram for explaining the sintering process performed according to the fifth embodiment.

FIG. 26 is a schematic diagram for explaining the sintering process performed according to the fifth embodiment. In the sintering process performed at Step S108 according to the fifth embodiment, the intermediate object 9C is heated while pressurizing the internal atmosphere of the glass pipe 3A through the holes formed in the second holding member 7B; the first holding member 6A and the second holding member 7B are consolidated; and the independent bubbles 12 are formed among the glass particles 8 while sintering the filled glass particles 8. As a result, an optical fiber preform 10D is manufactured in which the independent bubbles 12 are formed in the sintered area of the glass particles 8.

More specifically, as illustrated in a state S47 in FIG. 26, firstly, the lid 101B is put on the upper end portion 3Ac of the glass pipe 3A in the intermediate object 9C; and the inside of the intermediate object 9C is made airproof. In an identical manner to the fourth embodiment, to the lid 101B, the gas introduction pipes 100B and 101Aa are connected, and the manometer 107 is installed. Moreover, in an identical manner to the fourth embodiment, to the gas introduction pipe 101Aa are sequentially connected the exhaust valve 103a, the vacuum pump 103, and the gas exhaust pipe 104. Furthermore, the intermediate object 9C is set in the heating furnace 102A. Moreover, in an identical manner to the fourth embodiment, the light emitting device 108 and the measuring device 109 are disposed below and near the heating furnace 102A.

After the inside of the intermediate object 9C is made airproof as described above, the argon (Ar) gas coming from the gas introduction pipe 100B is introduced to the inside of the intermediate object 9C, such as the gaps among the filled glass particles 8, through the holes of the second holding member 7B from the side of the upper end portion 3Ac of the glass pipe 3A. Moreover, the exhaust valve 103a is opened and, in that state, the internal gas of the intermediate object 9C is sucked using the vacuum pump 103 through the holes formed in the second holding member 7B from the side of the upper end portion 3Ac of the glass pipe 3A; and the sucked internal gas is discharged from the gas exhaust pipe 104. As a result, the internal atmosphere of the glass pipe 3A in the intermediate object 9C is converted into argon (Ar) gas and is pressurized. At that time, in an identical manner to the fourth embodiment, the control unit 110 controls the exhaust valve 103a and the vacuum pump 103 based on the measurement value data obtained from the manometer 107, and accordingly controls the control pressure inside the intermediate object 9A within the range from equal to or greater than the lower limit of the pressure at which the independent bubbles 12 can be formed to equal to or smaller than the upper limit of the pressure at which deformation and rupture of the glass pipe at the time of heating can be avoided.

In parallel to the control operation performed for controlling the internal atmosphere, in an identical manner to the fourth embodiment, the heating furnace 102A heats the intermediate object 9C from the lower end portion 3Ad to the upper end portion 3Ac in a sequential manner along the outer periphery of the intermediate object 9C. Following the heating furnace 102A, the light emitting device 108 emits the light L1 onto the post-heating intermediate object 9C; and the measuring device 109 measures the power of the transmission light L2 that has passed through the post-heating intermediate object 9C, and sends the measurement value data of the measured power of the transmission light L2 to the control unit 110. In an identical manner to the fourth embodiment, the control unit 110 controls the exhaust valve 103a and the vacuum pump 103 based on the measurement value data obtained from the measuring device 109, and accordingly adjusts the control pressure inside the intermediate object 9C. As a result, the glass pipe 3A melts and undergoes diameter reduction from the lower end portion 3Ad to the upper end portion 3Ac in a sequential manner; and the first holding member 6B in the lower end portion 3Ad (see FIG. 18) becomes consolidated and transparent as well as the second holding member 7B in the upper end portion 3Ac becomes consolidated and transparent. Moreover, while the filled glass particles 8 are sequentially sintered from the lower end portion 3Ad toward the upper end portion 3Ac, the independent bubbles 12 are formed in the gaps among the filled glass particles 8. The independent bubbles 12 are formed inside the sintered area of the glass particles 8 and at distant positions from the core rods 4B-1 to 4B-4 in such a dispersed manner that the bubble density in the longitudinal direction of the intermediate object 9C is stable across the outer periphery of the core rods 4B-1 to 4B-4.

As a result of performing the sintering process, the optical fiber preform 10D is manufactured from the intermediate object 9C. The optical fiber preform 10D is a preform that includes: the portion in which the glass pipe 3A melted and underwent diameter reduction; the portion in which the first holding member 6B and the second holding member 7B became transparent; the sintered area of the glass particles 8 in which a plurality of independent bubbles 12 is formed; and the core rods 4B-1 to 4B-4 integrated with the other portions.

In the wiredrawing process performed at Step S110 according to the fifth embodiment, in the optical fiber wiredrawing furnace 105 illustrated in FIG. 22, the optical fiber preform 10D according to the fifth embodiment is set in place of the optical fiber preform 10C according to the fourth embodiment. Then, in an identical manner to the fourth embodiment, under the control performed by the control unit 110A regarding wiredrawing conditions, the optical fiber wiredrawing furnace 105 heat-melts the lower end portion of the optical fiber preform 10D, and wiredraws an optical fiber. The wiredrawn optical fiber is in the bare wire state without having any coating on its outer periphery, and is thus subjected to a coating operation using the die 106 (see FIG. 22). As a result, the optical fiber 11C illustrated in FIG. 23 is manufactured. In this way, the optical fiber 11C is obtained (Step S112), and it marks the end of the processes.

As a result of performing wiredrawing, the sintered area of the glass particles 8 in the optical fiber preform 10D becomes the independent bubble area (i.e., the second-type cladding layer 2Bb) that is a part of the cladding portion 2B of the optical fiber 11C and that is formed at a distant position from the core portions 1B with a plurality of independent bubbles 12 formed therein. Moreover, of the optical fiber preform 10D, the core forming portion of each of the core rods 4B-1 to 4B-4 (for example, each core forming portion 4Ba illustrated in FIG. 25) serves as one of the core portions 1B. The cladding forming portion of each of the core rods 4B-1 to 4B-4 (for example, each cladding forming portion 4Bb illustrated in FIG. 25) serves as one of the first-type cladding layers 2Ba; the portion in which the glass pipe 3A melted and underwent diameter reduction serves as the third-type cladding layer 2Bc; and the portion in which the first holding member 6B and the second holding member 7B became transparent serves as a part of the cladding portion 2B.

In the fifth embodiment, in the case of manufacturing an optical fiber from the intermediate object 9 without involving an optical fiber preform, the optical fiber manufacturing process includes the wiredrawing process performed at Step S111 (see FIG. 2). As a result of performing the wiredrawing process, the optical fiber 11C is obtained (Step S113), and it marks the end of the processes. Meanwhile, if the target according to the fifth embodiment is to manufacture an optical fiber preform, then the optical fiber preform 10D (see FIG. 26) manufactured as a result of performing the sintering process is treated as the target. In this way, the optical fiber preform 10D is obtained as the target (Step S114), and it marks the end of the processes.

On the other hand, in the wiredrawing process performed at Step S111 according to the fifth embodiment, firstly, in the optical fiber wiredrawing furnace 105 illustrated in FIG. 22, the intermediate object 9C according to the fifth embodiment is set in place of the optical fiber preform 10C according to the fourth embodiment. Then, in an identical manner to the sintering process illustrated in FIG. 26, while the control pressure adjustment is being performed, the internal atmosphere of the glass pipe 3A is pressurized through the holes formed in the second holding member 7B. In parallel to that, in an identical manner to the fourth embodiment, under the control performed by the control unit 110A regarding wiredrawing conditions, the optical fiber wiredrawing furnace 105 heats the intermediate object 9C. As a result, the optical fiber wiredrawing furnace 105 melts the glass pipe 3A and the core rods 4B-1 to 4B-4; consolidates the first holding member 6B and the second holding member 7B; and, with the bubbles formed among the glass particles 8 while sintering the filled glass particles 8 representing the independent bubbles 12, wiredraws an optical fiber from the intermediate object 9C. Subsequently, the wiredrawn optical fiber is subjected to a coating operation using the die 106, and consequently the optical fiber 11C having the configuration illustrated in FIG. 23 is manufactured from the intermediate object 9C.

As a result of performing the wiredrawing process, the sintering area of the glass particles 8 in the intermediate object 9C becomes the independent bubble area that represents a part of the cladding portion 2B of the optical fiber 11C and that is formed with a plurality of independent bubbles 12 at distant positions from the core portions 1B. Moreover, of the intermediate object 9C, the core forming portion of each of the core rods 4B-1 to 4B-4 serves as one of the core portions 1B. Moreover, the cladding forming portion of each of the core rods 4B-1 to 4B-4 serves as the first-type cladding layer 2Ba; the portion in which the glass pipe 3A melts and undergoes diameter reduction serves as the third-type cladding layer 2Bc; and the portion in which the first holding member 6B and the second holding member 7B become transparent serves as a part of the cladding portion 2B.

In the optical fiber manufacturing method according to the fifth embodiment, a plurality of multicore-type core rods, each of which has a plurality of core forming portions, is used; and, according to the method identical to the method in the third embodiment, the intermediate object 9C is manufactured in which the core rods of the intermediate object 9B according to the third embodiment are substituted with the multicore-type core rods (for example, the core rods 4B-1 to 4B-4). Then, in an identical manner to the fourth embodiment, the intermediate object 9C is heated while pressurizing the internal atmosphere of the glass pipe 3A in the intermediate object 9C; and, while sintering the filled glass particles 8 in the intermediate object 9C, a plurality of independent bubbles 12 is formed inside the sintered area of the glass particles 8 and at from the core rods in a dispersed manner in the longitudinal direction of the core rods across the outer periphery of the core rods. Hence, in addition to achieving the effects achieved in the third and fourth embodiments, the sintered area of the glass particles 8 including the independent bubbles 12 is treated as the independent bubble area as a result of performing the wiredrawing process, and a multicore fiber (for example, the optical fiber 11C) having an independent bubble area at a distant position from the core portions can be manufactured with ease.

Meanwhile, in the first to fifth embodiments, the core portion is made of silica glass added with $GeO_2$, and the cladding portion is made of pure silica glass. However, the present disclosure is not limited to that example. Alternatively, the core portion can be made of pure silica glass, and the cladding portion can be made of silica glass added with a dopant (such as fluorine) for lowering the refractive index. In that case too, the refractive index difference of the core portion with respect to the cladding portion can be set within, for example, the range from equal to or greater than 0.23% to equal to smaller than 3.5%.

Meanwhile, in the first to fifth embodiments, although the lower end portion of the glass pipe constituting the intermediate object is sealed, the present disclosure is not limited to that example. Alternatively, for example, the end portion of the glass pipe that is sealed in the sealing process can either be the upper end portion or be the lower end portion of the glass pipe.

Moreover, in the first to fifth embodiments, the first holding member and the second holding member, which hold the core rod in a sandwiched manner therebetween, have the outer shape as a disc shape, a columnar shape, or a conical shape. However, the present disclosure is not limited to that example. Alternatively, for example, by taking into account the shape and the size (the inner diameter) of the glass pipe to be housed therein, the first holding member and the second holding member can be set to have the desired shape (a disc shape, a columnar shape, a conical shape, or some other shape).

Meanwhile, in the first embodiment, although no independent bubbles are formed inside the sintered area of the glass particles, the present disclosure is not limited to that example. For example, as illustrated in the first embodiment, glass plates having a plurality of holes formed therein can be used as the first holding member and the second holding member; and, in an identical manner to the fourth embodiment, independent bubbles can be formed inside the sintered area of the glass particles.

Moreover, in the third and fifth embodiments, as an example, four core rods are prepared. However, the present disclosure is not limited to that example. Alternatively, for example, the number of core rods prepared in the third and fifth embodiments can be equal to or greater than two (i.e., can be in plurality). Moreover, the arrangement of the core rods is not limited to a square lattice as described earlier, and a desired arrangement can be adapted.

Furthermore, in the first to fifth embodiments described above, the number of core forming portions included in a single core rod is either one or four. However, the present disclosure is not limited to that example. Alternatively, for example, in the first to fifth embodiments, the number of core forming portions included in a single core rod can be one or more. Moreover, the arrangement of the core forming portions included in a single core rod is not limited to a square lattice as described earlier, and a desired arrangement can be adapted.

Furthermore, in the first to fifth embodiments, the dehydroxylation process is performed for dehydroxylation of the filled glass particles. However, the present disclosure is not limited to that example. Alternatively, for example, by taking into account the permissible transmission loss in an optical fiber or by taking into account the state of the filled glass particles, dehydroxylation can be performed as necessary.

Moreover, in the fourth and fifth embodiments described above, based on the power of the transmission light that has transmitted through the intermediate object being heated in the sintering process or through the optical fiber being wiredrawn in the wiredrawing process, the pressure to be applied in the gaps among the filled glass particles (i.e., the control pressure) is controlled or the wiredrawing conditions are controlled. However, the present disclosure is not limited to that example. Alternatively, for example, the control pressure or the wiredrawing conditions can be controlled based on the power of the reflected light that is reflected from the intermediate object or the optical fiber, or the control pressure or the wiredrawing conditions can be controlled based on at least either the power of the transmission light or the power of the reflected light.

Herein, although the present disclosure is described with reference to the abovementioned embodiments for a complete and clear disclosure, the appended claims are not to be thus limited but are to be construed as embodying all modifications and alternative constructions that may occur to one skilled in the art that fairly fall within the basic teaching herein set forth.

According to the present disclosure, it becomes possible to obtain an optical fiber having a stable core diameter in the longitudinal direction.

As described above, the optical fiber manufacturing method according to the present disclosure is suitable as an optical fiber manufacturing method that enables obtaining an optical fiber having a stable core diameter in the longitudinal direction.

What is claimed is:

1. An optical fiber manufacturing method for manufacturing an optical fiber that includes a core portion made of glass and a cladding portion made of glass and formed on outer periphery of the core portion, the optical fiber manufacturing method comprising:

setting such that a first holding member and a core rod are placed inside a glass pipe constituting the cladding portion, the first holding member being one of a pair of holding members that are made of glass and have a plurality of holes formed thereon, the core rod including a core forming portion serving as the core portion and including a cladding forming portion serving as a portion adjacent to the core portion across outer periphery of the core portion, in such a way that the core rod is supported by the first holding member;

filling glass particles in a gap between the core rod and an inner wall of the glass pipe;

holding the core rod such that a second holding member of the pair of holding members is placed inside the glass pipe, in such a way that the core rod is held in a sandwiched manner in between the first holding member and the second holding member, and the core rod and the filled glass particles are housed in an area enclosed by the inner wall of the glass pipe, the first holding member, and the second holding member, and sealing one end portion of the glass pipe and manufacturing an intermediate object; and manufacturing an optical fiber using the intermediate object, wherein a bulk density of the first holding member and the second holding member is set to be within a predetermined range with reference to bulk density of a filling portion filled with the glass particles, and the predetermined range is determined according to a permissible variation range for a core diameter in longitudinal direction of the optical fiber.

2. The optical fiber manufacturing method according to claim 1, further comprising dehydroxylating by circulating a reducing gas inside the glass pipe through the plurality of holes.

3. The optical fiber manufacturing method according to claim 1, wherein the first holding member and the second holding member are glass plates having the plurality of holes formed therein.

4. The optical fiber manufacturing method according to claim 1, wherein the first holding member as well as the second holding member is a glass powder molded body and is a glass porous body having the plurality of holes formed therein.

5. The optical fiber manufacturing method according to claim 4, wherein the glass porous body includes a molding portion of glass powder with average particle diameter Da equal to or greater than 0.3 μm.

6. The optical fiber manufacturing method according to claim 1, wherein the optical fiber includes a plurality of the core portion, the setting includes placing, inside the glass pipe, the first holding member and a plurality of the core rod in such a way that the plurality of the core rods are supported by the first holding member, the filling glass particles includes filling the glass particles in gaps between the inner wall face and the plurality of core rods, and the holding includes housing the plurality of the core rods and the filled glass particles in an area enclosed by the inner wall of the glass pipe, the first holding member, and the second holding member, and holding the plurality of the core rods in a sandwiched manner in between the first holding member and the second holding member.

7. The optical fiber manufacturing method according to claim 1, wherein the glass particles that are filled in the filling glass particles have average particle diameter equal to or greater than 50 μm and equal to or smaller than 500 μm.

8. The optical fiber manufacturing method according to claim 1, wherein the manufacturing the optical fiber includes a sintering process that includes heating the intermediate object while depressurizing internal atmosphere of the glass pipe through the plurality of holes, consolidating the first holding member, the second holding member, and the filled glass particles, and manufacturing an optical fiber preform, and a wiredrawing process that includes heat-melting the optical fiber preform and wiredrawing an optical fiber.

9. The optical fiber manufacturing method according to claim 1, wherein the manufacturing the optical fiber includes a sintering process that includes heating the intermediate object while controlling internal atmosphere of the glass pipe through the plurality of holes, consolidating the first holding member and the second holding member, forming, as an independent bubble, an isolated bubble among the glass particles while sintering the filled glass particles, and manufacturing an optical fiber preform that includes a sintering area of the glass particles in which a plurality of the independent bubble is included, and a wiredrawing process that heat-melts the optical fiber preform, and wiredrawing the optical fiber that includes treating sintering area of the glass particles as an independent bubble area that is a part of the cladding portion and that is formed at a distant position from the core portion with the plurality of the independent bubbles formed therein.

10. The optical fiber manufacturing method according to claim 1, wherein the manufacturing the optical fiber includes a wiredrawing process that includes heating the intermediate object while depressurizing internal atmosphere of the glass pipe through the plurality of holes, melting the glass pipe and the core rod, consolidating the first holding member, the second holding member, and the filled glass particles, and wiredrawing an optical fiber.

11. The optical fiber manufacturing method according to claim 1, wherein the manufacturing the optical fiber includes heating the intermediate object while controlling internal atmosphere of the glass pipe through the plurality of holes, melting the glass pipe and the core rod, consolidating the first holding member and the second holding member, forming; as an independent bubble, an isolated bubbles among the glass particles while sintering the filled glass particles, and wiredrawing an optical fiber, and
the wiredrawing the optical fiber includes treating sintering area of the glass particles, in which a plurality of the independent bubbles is formed, as an independent bubble area that is a part of the cladding portion and that is formed at a distant position from the core portion with the plurality of the independent bubbles formed therein.

* * * * *